(12) United States Patent
Tenore et al.

(10) Patent No.: US 11,773,330 B2
(45) Date of Patent: Oct. 3, 2023

(54) SYSTEM AND PROCESS FOR CONVERTING WASTE PLASTIC INTO FUEL

(71) Applicant: BRAVEN ENVIRONMENTAL, LLC, Yonkers, NY (US)

(72) Inventors: Anthony F. Tenore, Yonkers, NY (US); David Fowler, Yonkers, NY (US); Oluwadare Oluwaseun, Yonkers, NY (US); Anthony N. Tenore, Yonkers, NY (US)

(73) Assignee: Braven Environmental, LLC, Yonkers, NY (US)

( * ) Notice: Subject to any disclaimer, the term of this patent is extended or adjusted under 35 U.S.C. 154(b) by 46 days.

(21) Appl. No.: 16/907,595

(22) Filed: Jun. 22, 2020

(65) Prior Publication Data

US 2020/0369964 A1    Nov. 26, 2020

Related U.S. Application Data

(62) Division of application No. 15/641,471, filed on Jul. 5, 2017, now Pat. No. 10,731,082.

(Continued)

(51) Int. Cl.
*C10B 47/44* (2006.01)
*B30B 9/12* (2006.01)
(Continued)

(52) U.S. Cl.
CPC ............ *C10B 47/44* (2013.01); *B01D 53/002* (2013.01); *B30B 9/121* (2013.01); *C10B 31/08* (2013.01);
(Continued)

(58) Field of Classification Search
CPC ......... C10B 31/08; C10B 47/44; C10B 53/07; C10B 53/00; C10B 47/18; B01D 53/002;
(Continued)

(56) References Cited

U.S. PATENT DOCUMENTS 836,701 A    11/1906    Oliver
2,351,422 A    6/1944    Gohr
(Continued)

FOREIGN PATENT DOCUMENTS

CA    2 660 678 A1    2/2008
CA    2 668 886 A1    5/2008
(Continued)

OTHER PUBLICATIONS

DE10201869A1_ENG (Espacenet machine translation of Bayer) (Year: 2003).*

(Continued)

*Primary Examiner* — Gabriel E Gitman
(74) *Attorney, Agent, or Firm* — Riverside Law LLP

(57) ABSTRACT

An apparatus is provided for processing reusable fuel comprising: a continuous material supply assembly; a heated airlock feeder configured to continuously receive and process the material supply received therein; a reactor configured to receive the processed material from the heated airlock feeder; and a vapor refining system configured to process vapor supplied by the reactor. The apparatus may comprise a char disposal system configured to eliminate char from the reactor. The apparatus may also comprise a thermal expansion system configured to allow thermal expansion of the reactor. A cooling system may be configured to receive processed fuel from the reactor.

11 Claims, 22 Drawing Sheets

Related U.S. Application Data

(60) Provisional application No. 62/493,445, filed on Jul. 5, 2016.

(51) Int. Cl.

| | | |
|---|---|---|
| *B01D 53/00* | (2006.01) | |
| *C10K 1/02* | (2006.01) | |
| *C10K 1/04* | (2006.01) | |
| *C10B 31/08* | (2006.01) | |
| *C10B 53/07* | (2006.01) | |
| *C10G 1/02* | (2006.01) | |
| *C10G 1/10* | (2006.01) | |

(52) U.S. Cl.
CPC ............... *C10B 53/07* (2013.01); *C10G 1/02* (2013.01); *C10G 1/10* (2013.01); *C10K 1/026* (2013.01); *C10K 1/04* (2013.01); *B01D 2257/702* (2013.01); *C10G 2300/1003* (2013.01); *C10G 2400/02* (2013.01); *C10G 2400/04* (2013.01); *Y02P 20/133* (2015.11); *Y02P 20/143* (2015.11)

(58) Field of Classification Search
CPC .... B01D 2257/702; B30B 9/121; C10G 1/02; C10G 1/10; C10G 2300/1003; C10G 2400/02; C10G 2400/04; C10K 1/026; C10K 1/04; Y02P 20/133; Y02P 20/143; Y02P 20/145; B01J 2204/007; B01J 4/007; B01J 2219/00094; B01J 6/005; B01J 7/00; B01J 8/0045; B01J 19/20; C10L 5/48; C10L 2290/145; C10L 2290/148; C10L 2290/543; B65G 65/02; B65G 33/24; B65G 33/34; B65G 65/30; B65G 65/32; B29B 7/60; B29B 7/46; B29B 7/48; Y02E 50/10; Y02E 50/30
See application file for complete search history.

(56) References Cited

U.S. PATENT DOCUMENTS

| | | | |
|---|---|---|---|
| 2,453,068 A | | 1/1949 | Fuller |
| 2,546,846 A | * | 3/1951 | Atkin .................... H02K 7/145 451/511 |
| 2,616,519 A | | 11/1952 | Crankshaw et al. |
| 2,916,121 A | | 8/1953 | Lips et al. |
| 3,129,459 A | | 4/1964 | Kullgren et al. |
| 3,151,784 A | | 10/1964 | Tailor |
| 3,183,553 A | * | 5/1965 | Slater .................... B29C 48/286 366/186 |
| 3,455,789 A | | 10/1965 | Landers |
| 3,458,321 A | | 7/1969 | Reinhart et al. |
| 3,797,702 A | | 3/1974 | Robertson |
| 3,822,866 A | | 7/1974 | Daester et al. |
| 3,907,259 A | | 9/1975 | Leclercq |
| 3,947,256 A | | 3/1976 | Tsukagoshi |
| 3,962,043 A | | 6/1976 | Schmalfeld et al. |
| 3,981,454 A | | 9/1976 | Williams |
| 4,025,058 A | | 5/1977 | Mizuguchi |
| 4,123,332 A | | 10/1978 | Rotter |
| 4,261,225 A | * | 4/1981 | Zahradnik ............. B29C 48/252 366/100 |
| 4,426,018 A | | 1/1984 | Ward |
| 4,437,046 A | | 3/1984 | Faillace |
| 4,437,048 A | | 3/1984 | Arnold |
| 4,473,478 A | | 9/1984 | Chivrall |
| 4,500,481 A | | 2/1985 | Marx, III |
| 4,529,579 A | | 7/1985 | Raahauge |
| 4,640,203 A | | 2/1987 | Wolter et al. |
| 4,842,126 A | | 6/1989 | McConnell |
| 4,875,847 A | | 10/1989 | Wenger et al. |
| 5,032,143 A | | 7/1991 | Ritakallio |
| 5,078,857 A | | 1/1992 | Melton |
| 5,129,995 A | | 7/1992 | Agarwal |
| 5,174,479 A | | 12/1992 | Dufour |
| 5,205,225 A | | 4/1993 | Milsap, III |
| 5,394,937 A | | 3/1995 | Nieh |
| 5,611,268 A | | 3/1997 | Hamilton |
| 5,720,232 A | | 2/1998 | Meador |
| 5,732,829 A | | 3/1998 | Smith |
| 5,756,871 A | | 5/1998 | Wang |
| 5,762,666 A | | 6/1998 | Amrein et al. |
| 5,993,751 A | | 11/1999 | Moriarty et al. |
| 6,063,355 A | | 5/2000 | Fujimura et al. |
| 6,109,902 A | | 8/2000 | Goris et al. |
| 6,126,907 A | * | 10/2000 | Wada ..................... C10B 7/10 422/184.1 |
| 6,221,329 B1 | | 4/2001 | Faulkner et al. |
| 6,270,630 B1 | | 8/2001 | Xing |
| 6,276,286 B1 | | 8/2001 | Williams et al. |
| 6,298,751 B1 | | 10/2001 | Ide et al. |
| 6,387,221 B1 | | 5/2002 | Schoenhard |
| 6,455,789 B1 | | 9/2002 | Allison |
| 6,534,689 B1 | | 3/2003 | Stankevitch |
| 6,634,508 B1 | | 10/2003 | Ishigaki |
| 6,758,150 B2 | | 7/2004 | Ballantine et al. |
| 7,144,558 B2 | * | 12/2006 | Smith ..................... C10B 7/10 202/226 |
| 7,301,060 B2 | | 11/2007 | Appel et al. |
| 7,311,509 B2 | | 12/2007 | Lupke |
| 7,476,296 B2 | | 1/2009 | Appel et al. |
| 7,692,050 B2 | | 4/2010 | Adams et al. |
| 7,771,699 B2 | | 8/2010 | Adams et al. |
| 7,906,695 B2 | | 3/2011 | Giercke |
| 8,003,833 B2 | | 8/2011 | Appel et al. |
| 8,200,238 B2 | | 6/2012 | Gildea et al. |
| 8,215,477 B2 | | 7/2012 | Basaglia et al. |
| 8,304,590 B2 | | 11/2012 | Hopkins et al. |
| 8,344,195 B2 | | 1/2013 | Srinakruang |
| 8,372,248 B1 | | 2/2013 | Sherry |
| 8,518,218 B2 | | 8/2013 | Ali et al. |
| 8,548,501 B2 | | 10/2013 | Gildea |
| 8,574,325 B2 | | 11/2013 | Jensen et al. |
| 8,696,994 B2 | | 4/2014 | Miller |
| 8,801,904 B2 | | 8/2014 | Miller et al. |
| 8,809,606 B2 | | 8/2014 | Appel et al. |
| 8,877,992 B2 | | 11/2014 | Appel et al. |
| 9,045,693 B2 | | 6/2015 | Wolfe |
| 9,052,109 B1 | | 6/2015 | Fowler |
| 9,220,798 B2 | | 12/2015 | McKee et al. |
| 9,275,655 B2 | | 3/2016 | Wilson et al. |
| 9,624,439 B2 | | 4/2017 | Bakaya et al. |
| 9,630,345 B2 | | 4/2017 | Alsewailem |
| 9,795,940 B2 | | 10/2017 | Miller et al. |
| 9,863,597 B2 | | 1/2018 | Henry et al. |
| 10,233,393 B2 | | 3/2019 | Oluwaseun |
| 10,731,082 B2 | * | 8/2020 | Tenore ................... C10B 53/07 |
| 2002/0048523 A1 | | 4/2002 | Achtelik et al. |
| 2003/0047437 A1 | | 3/2003 | Stankevitch |
| 2003/0098227 A1 | | 5/2003 | Okamoto et al. |
| 2003/0127310 A1 | | 7/2003 | Lemmons et al. |
| 2003/0130548 A1 | * | 7/2003 | Lemmons ................ C10G 1/02 422/198 |
| 2004/0003481 A1 | | 1/2004 | Tarrant |
| 2004/0144698 A1 | | 7/2004 | Hilpert et al. |
| 2005/0219943 A1 | | 10/2005 | Yamane et al. |
| 2006/0021189 A1 | | 2/2006 | Johnson |
| 2006/0211899 A1 | | 9/2006 | Lee |
| 2007/0094929 A1 | | 5/2007 | Kang et al. |
| 2007/0178326 A1 | | 8/2007 | Hong |
| 2007/0179326 A1 | | 8/2007 | Baker |
| 2007/0193408 A1 | | 8/2007 | Martinez |
| 2008/0038071 A1 | | 2/2008 | Bodie et al. |
| 2008/0105141 A1 | * | 5/2008 | Duperon ................ B30B 9/121 100/106 |
| 2008/0128259 A1 | | 6/2008 | Kostek et al. |
| 2008/0129259 A1 | | 6/2008 | Endo |
| 2008/0202983 A1 | | 8/2008 | Smith |
| 2008/0286557 A1 | | 11/2008 | Tucker |
| 2010/0008836 A1 | * | 1/2010 | Pecci ....................... C10B 7/10 422/229 |
| 2010/0008838 A1 | | 1/2010 | Pecci |

(56) References Cited

U.S. PATENT DOCUMENTS

| | | |
|---|---|---|
| 2010/0024696 A1 | 2/2010 | Cauley et al. |
| 2010/0200229 A1 | 8/2010 | Jefferd |
| 2010/0202243 A1 | 8/2010 | Stirner |
| 2010/0289175 A1 | 11/2010 | Feichtinger et al. |
| 2010/0329938 A1* | 12/2010 | Allan ............... B01J 3/008 422/186.01 |
| 2011/0020190 A1 | 1/2011 | Miller |
| 2011/0089081 A1 | 4/2011 | Srinakruang |
| 2011/0290057 A1 | 12/2011 | Corcoran |
| 2012/0024106 A1 | 2/2012 | Brotzki |
| 2012/0024687 A1 | 2/2012 | Bratina et al. |
| 2012/0261247 A1 | 10/2012 | McNamara et al. |
| 2012/0289753 A1 | 11/2012 | Luengo Marin et al. |
| 2013/0299333 A1 | 11/2013 | Tucker et al. |
| 2014/0054815 A1 | 2/2014 | Houk et al. |
| 2014/0121426 A1 | 5/2014 | Tandon |
| 2014/0262728 A1* | 9/2014 | Karanikas ............... C10B 53/07 202/105 |
| 2014/0332363 A1 | 11/2014 | McGolden |
| 2014/0332444 A1 | 11/2014 | Weiss et al. |
| 2014/0339726 A1* | 11/2014 | Guven ............... B29C 48/29 264/140 |
| 2015/0023826 A1 | 1/2015 | Desiron |
| 2015/0053542 A1* | 2/2015 | Liang ............... C10B 49/16 201/7 |
| 2015/0064297 A1 | 3/2015 | Yang |
| 2015/0073181 A1 | 3/2015 | Gorke et al. |
| 2015/0080624 A1 | 3/2015 | Gephart et al. |
| 2015/0166911 A1 | 6/2015 | Reed |
| 2015/0259603 A1 | 9/2015 | Hallowell et al. |
| 2015/0314513 A1 | 11/2015 | Takamoto et al. |
| 2015/0362183 A1 | 12/2015 | Bertram |
| 2015/0368563 A1 | 12/2015 | Funk |
| 2016/0068771 A1 | 3/2016 | Appel et al. |
| 2017/0036378 A1 | 2/2017 | Yanev et al. |
| 2017/0218278 A1 | 8/2017 | Bakaya et al. |
| 2017/0283707 A1 | 10/2017 | Gephart et al. |
| 2017/0361329 A1 | 12/2017 | Behrens et al. |
| 2017/0361558 A1 | 12/2017 | Tenore et al. |
| 2018/0056262 A1 | 3/2018 | Miller et al. |

FOREIGN PATENT DOCUMENTS

| | | | |
|---|---|---|---|
| CH | 703609 A2 * | 2/2012 | ............ C10B 47/44 |
| CL | 199800382 | 11/1998 | |
| CL | 201803679 | 12/2018 | |
| CN | 1968765 A | 6/2005 | |
| CN | 101700692 A | 10/2009 | |
| CN | 101616970 A | 12/2009 | |
| CN | 101700692 A | 5/2010 | |
| CN | 104211629 A | 5/2013 | |
| CN | 103153450 A | 6/2013 | |
| CN | 202988144 U | 6/2013 | |
| CN | 204699419 U | 10/2015 | |
| CN | 204737927 U | 11/2015 | |
| CN | 105542830 A | 5/2016 | |
| DE | 1769235 A1 | 10/1971 | |
| DE | 19724146 A1 | 12/1998 | |
| DE | 10201869 A1 | 1/2002 | |
| DE | 102 01 869 A1 | 7/2003 | |
| DE | 10201869 A1 | 7/2003 | |
| DE | 10201869 A1 * | 7/2003 | ......... B29C 48/2886 |
| DE | 102 01 869 B4 | 8/2005 | |
| DE | 202013007632 U1 | 10/2013 | |
| DE | 20 2013 009 015 U1 | 1/2014 | |
| DE | 20 2013 009 015 U1 | 3/2014 | |
| EP | 2440633 A1 | 4/2012 | |
| GB | 739854 * | 11/1955 | ......... F16H 57/0416 |
| GB | 766003 | 1/1957 | |
| GB | 1174133 | 5/1967 | |
| GB | 1174133 A | 5/1967 | |
| JP | 50-60681 U | 6/1975 | |
| JP | S6063543 | 4/1985 | |
| JP | 6063543 U | 5/1985 | |
| JP | 60-179407 U | 11/1985 | |
| JP | S6117879 | 1/1986 | |
| JP | 6117879 B2 | 5/1986 | |
| JP | 62187791 A | 8/1987 | |
| JP | S62187791 | 8/1987 | |
| JP | 2-229588 U | 9/1990 | |
| JP | 7505824 A | 6/1995 | |
| JP | H07505824 | 6/1995 | |
| JP | 07256645 A | 10/1995 | |
| JP | 1995256645 A | 10/1995 | |
| JP | 1996216148 A | 8/1996 | |
| JP | 8334221 | 12/1996 | |
| JP | H08334221 | 12/1996 | |
| JP | 9-104874 A | 4/1997 | |
| JP | 9104874 A | 4/1997 | |
| JP | 2000001677 A | 6/1998 | |
| JP | 2000001677 A | 1/2000 | |
| JP | 20000107272 A | 1/2000 | |
| JP | 2002037916 A | 7/2000 | |
| JP | 2001296009 A | 10/2001 | |
| JP | 3334221 | 10/2002 | |
| JP | 2003-10825 A | 1/2003 | |
| JP | 2005280254 A | 10/2005 | |
| JP | 2006-89742 A | 4/2006 | |
| JP | 2007529574 A | 10/2007 | |
| JP | 2007-332222 A | 12/2007 | |
| JP | 2008155582 A | 7/2008 | |
| JP | 2009007537 A | 1/2009 | |
| JP | 2009096966 A | 5/2009 | |
| JP | 2009220433 A | 10/2009 | |
| JP | 2010-500170 A | 1/2010 | |
| JP | 2010500170 A | 1/2010 | |
| JP | 2010184297 A | 8/2010 | |
| JP | 6063543 | 1/2017 | |
| KR | 20030051913 A | 6/2003 | |
| KR | 10-2003-0051913 B1 | 7/2003 | |
| KR | 20030051913 | 7/2003 | |
| KR | 20030051913B1K B1 | 7/2003 | |
| KR | 1020030051913 | 7/2003 | |
| KR | 20050013304 A | 2/2005 | |
| KR | 10-2006-0012934 A | 2/2006 | |
| KR | 10-0686370 B1 | 2/2007 | |
| KR | 100686370 B1 | 2/2007 | |
| KR | 1020030051913 B1 * | 2/2007 | ............... C10G 1/10 |
| KR | 10-2009-0117377 A | 11/2009 | |
| KR | 1020090117377 A | 11/2009 | |
| KR | 101006224 B1 | 1/2011 | |
| KR | 20120103832 A | 3/2011 | |
| KR | 10-2012-0103832 A | 9/2012 | |
| KR | 20120103832 A | 9/2012 | |
| KR | 101289867 B1 * | 7/2013 | ............... B09B 3/40 |
| KR | 10-2014-0110906 | 9/2014 | |
| KR | 10-2014-0110906 A | 9/2014 | |
| SU | 509433 A1 | 4/1976 | |
| SU | 509433 A1 | 5/1976 | |
| WO | 90/11475 | 10/1990 | |
| WO | 90/11475 A1 | 10/1990 | |
| WO | 01/05910 A1 | 1/2001 | |
| WO | 0105910 A1 | 1/2001 | |
| WO | 2008/017953 A2 | 2/2008 | |
| WO | 2008017953 A2 | 2/2008 | |
| WO | 2009/129233 A2 | 10/2009 | |
| WO | 2009129233 A2 | 10/2009 | |
| WO | 2011/132210 A1 | 10/2011 | |
| WO | 2014200123 A1 | 12/2014 | |
| WO | 2017116733 | 7/2017 | |
| WO | 2017221181 A1 | 12/2017 | |

OTHER PUBLICATIONS

KR1020030051913B1_ENG (Espacenet machine translation of Ku Jae-Wan) (Year: 2007).*

KR101289867B1_ENG (Especenet machine translation of Lim) (Year: 2013).*

KR1020030051913B1_ENG (Kipris mahine translation of Ku Jae-Wan) (Year: 2007).*

CH703609A2_ENG (Espacenet machine translation of Kosior) (Year: 2012).*

(56) References Cited

OTHER PUBLICATIONS

KR101289867B1_ENG (Espacenet machine translation of Lim) (Year: 2013).*
Office Action received in Chinese Application No. 201780038052X dated Aug. 5, 2020.
Written Opinion received in Singapore Application No. 11201810944 3 dated Jul. 31, 2020.
Notification received in ARIPO Application No. AP/P/2018/011139 issued Aug. 12, 2020.
Office Action received in Brazilian Application No. BR112018073056-4 dated Jun. 16, 2020.
Office Action received in Chinese Application No. 2017800425770 dated Jun. 19, 2020.
Official Action received in Columbian Application No. NC2018/0013306 dated May 28, 2020.
Office Action received in Japanese Application No. 2019-512039 dated Jul. 2, 2020.
Office Action received in Brazilian Application No. BR20112019000218-9 dated Jun. 6, 2020.
Office Action received in Brazilian Patent Application No. BR112018076624-0 dated Oct. 28, 2020.
Office Action received in Japanese Patent Application No. 2018-566447 dated Nov. 10, 2020.
Examination Report received in Indian Patent Application No. 201927001910 dated Nov. 13, 2020.
Office Action received in Chinese Patent Application No. 2017800425770 dated Nov. 17, 2020.
Examination Report received in Indian Patent Application No. 201827046572 dated Dec. 2, 2020.
Office Action received in Brazilian Patent Application No. BR112019000218-9 dated Nov. 16, 2020.
Examination Report received in Indian Patent Application No. 201927004293 dated Oct. 20, 2020.
Office Action received in Japanese Patent Application No. 2018-568870 dated Nov. 12, 2020.
Official Action received in European Patent Application No. 17 823 741.8-1104 dated Nov. 4, 2020.
Examination Report received in Indian Patent Application No. 201927004072 dated Nov. 24, 2020.
Office Action received in Dominican Republic Application No. P2018-0286 dated Sep. 28, 2020.
Office Action received in Panamanian Application No. 92484-01.
Office Action received in Brazilian Application No. BR112018076425-6 dated Aug. 10, 2020.
Office Action received in Chinese Application No. 2017800378727 dated Oct. 14, 2020.
Office Action received in Panamanian Application No. 92477-01.
Office Action received in Columbian Application No. NC2018/0013306 dated Sep. 14, 2020.
Office Action received in Dominican Republic Application No. P2018-0250 dated Sep. 28, 2020.
Office Action received in Korean Application No. 10-2018-7035626 dated Aug. 21, 2020.
Office Action received in Chinese Application No. 2017800417242 dated Oct. 20, 2020.
Office Action received in Chilean Application No. 201803876 dated Aug. 12, 2020.
Office Action received in Chinese Application No. 2017800417331 dated Aug. 20, 2020.
Office Action received in Dominican Republic Application No. P2018-0294 dated Sep. 28, 2020.
Office Action received in U.S. Appl. No. 15/628,922 dated Aug. 24, 2020.
Examination Report received in New Zealand Application No. 749263 dated Mar. 18, 2021.
Examination Report received in Australian Application No. 2017283225 dated May 31, 2021.
Office Action received in Chinese Application No. 2017800378727 dated Apr. 2, 2021.
Office Action received in Columbian Application No. NC2019/0000496 dated May 3, 2021.
Office Action received in Columbian Application No. NC2018/0013306 dated May 31, 2021.
Office Action received in Korean Application No. 10-2020-7029936 dated Apr. 30, 2021.
Official Action received in Columbian Patent Application No. NC2019/0000773 dated Apr. 28, 2020.
Official Action received in Brazilian Patent Application No. BR112019000051-8 dated May 11, 2020.
Official Action received in Japanese Patent Application No. 2018-568343 dated May 15, 2020.
Official Action received in New Zealand Patent Application No. 749216 dated Apr. 20, 2020.
Official Action received in U.S. Appl. No. 15/628,922 dated Apr. 9, 2020.
Official Action received in Chilean Patent Application No. 201803676 dated Mar. 16, 2020.
Official Action received in Chilean Patent Application No. 201803679 dated Mar. 31, 2020.
Official Action received in Chilean Patent Application No. 201803831 dated Mar. 16, 2020.
Official Action received in Brazilian Patent Application No. BR112018076624-0 dated Mar. 30, 2021.
Official Action received in Japanese Patent Application No. 2018-566447 dated Mar. 12, 2021.
Official Action received in Japanese Patent Application No. 2018-566366 dated Feb. 9, 2021.
Official Action received in Japanese Patent Application No. 2019-512039 dated Feb. 26, 2021.
Official Action received in Panamanian Patent Application No. 92432-01 mailing date unclear.
Official Action received in Saudi Arabian Patent Application No. 518400408 dated Mar. 31, 2021.
Official Action received in Chinese Patent Application No. 201780041724.2 dated Apr. 2, 2021.
Official Action received in Columbian Patent Application No. NC2019/0000773 dated Feb. 12, 2021.
Official Action received in European Patent Application No. 17823725.1 dated Jan. 22, 2021.
Official Action received in Japanese Patent Application No. 2018-568870 dated Mar. 12, 2021.
Official Action received in Chinese Patent Application No. 2017800417331 dated Apr. 6, 2021.
Official Action received in Columbian Patent Application No. NC2019/0000790 dated Feb. 8, 2021.
Official Action received in Singapore Patent Application No. 11201811050P dated Mar. 4, 2021.
Office Action received in ARIPO Application No. AP/P/2018/011208 dated Jan. 7, 2021.
Office Action received in Chinese Application No. 201780038052.X dated Jan. 13, 2021.
Office Action received in Columbian Application No. NC2019/0000481 dated Jan. 20, 2021.
Office Action received in ARIPO Application No. AP/P/2018/011206 dated Jan. 6, 2021.
Office Action received in Brazilian Application No. BR112018076425-6 dated Jan. 19, 2021.
Office Action received in ARIPO Application No. AP/P/2018/011237 dated Jan. 19, 2021.
Search Report and Expert Report received in Chilean Application No. 201803676 dated Dec. 16, 2019.
Extended European Search Report received in European Application No. 17814858.1 dated Jan. 8, 2020.
Expert Report received in Chilean Application No. 201803174 dated Dec. 31, 2019.
Office Action received in Chinese Application No. 201780042577.0 dated Jan. 21, 2020.
Extended European Search Report received in Application No. 17795725.5 dated Nov. 26, 2019.
Search Report and Expert Report received in Chilean Application No. 201803831 dated Nov. 13, 2019.

(56) References Cited

OTHER PUBLICATIONS

Office Action received in Canadian Application No. 3,029,578 dated Nov. 18, 2019.
Search Report and Expert Report received in Chilean Application No. 201803876 dated Dec. 2, 2019.
Extended European Search Report received in Application No. 17823741.8 dated Nov. 15, 2019.
Office Action received in Japanese Application No. 2018-568343 dated Jan. 8, 2020.
Office Action received in Korean Application No. 10-2019-7003338 dated Nov. 20, 2019.
Office Action received in U.S. Appl. No. 15/641,471 dated Jan. 21, 2020.
Office Action received in U.S. Appl. No. 15/062,319 dated Feb. 2, 2018.
Office Action received in U.S. Appl. No. 15/628,844 dated Feb. 26, 2019.
U.S. Office Action dated May 3, 2018 in U.S. Appl. No. 15/062,319.
U.S. Office Action dated Jun. 6, 2018 in U.S. Appl. No. 15/641,471.
Office Action received in U.S. Appl. No. 16/263,088 dated Aug. 29, 2019.
Office Action received in U.S. Appl. No. 15/641,471 dated Aug. 15, 2019.
Office Action received in U.S. Appl. No. 15/628,844 dated Jun. 19, 2019.
Office Action received in U.S. Appl. No. 15/628,922 dated Aug. 27, 2019.
Office Action received in U.S. Appl. No. 15/641,471 dated Apr. 1, 2019.
Office Action received in U.S. Appl. No. 15/628,922 dated Apr. 29, 2019.
Office Action received in U.S. Appl. No. 16/263,088 dated May 8, 2019.
Official Action received in Chilean Application No. 201803679 (3679-2018) dated Aug. 1, 2019.
Non-Final Office Action in corresponding U.S. Appl. No. 15/477,312 dated Sep. 17, 2018.
Non-Final Office Action in corresponding U.S. Appl. No. 15/054,903 dated Oct. 3, 2018.
Non-Final Office Action in corresponding U.S. Appl. No. 15/593,579 dated Oct. 3, 2018.
Non-Final Office Action in corresponding U.S. Appl. No. 15/641,471 dated Oct. 25, 2018.
Office Action received in U.S. Appl. No. 15/628,844 dated Sep. 11, 2019.
Office Action received in U.S. Appl. No. 15/628,922 dated Nov. 5, 2019.
Office Action received in Australian Patent Application No. 2017293458 dated Oct. 31, 2019.
Office Action received in New Zealand Patent Application No. 749216 dated Nov. 15, 2019.
Written Opinion received in Singapore Application No. 11201810958U dated Feb. 18, 2020.
Extended European Search Report received in European Application No. 17814859.9 dated Jan. 30, 2020.
Written Opinion received in Singapore Application No. 11201810944S dated Feb. 18, 2020.
Official Action received in Chile Application No. 201803174 dated Mar. 16, 2020.
Extended European Search Report received in European Application No. 17823725.1 dated Feb. 27, 2020.
Examination Report received in New Zealand Application No. 749216 dated Feb. 27, 2020.
Office Action received in U.S. Appl. No. 15/641,471 dated Mar. 18, 2020.
Search Report and Written Opinion received in corresponding PCT Application No. PCT/IB2017/054058 dated Nov. 9, 2017.
CN202988144U_Eng (Patentscope machine translation of Zhu) (Year: 2013).
DE202013007632U1_Eng (Espacenet machine translation of Wichelmann (Year: 2013).
Examination Report (including English translation) issued in App. No. SA519400796, dated Dec. 22, 2021, 10 pages.
Israeli Office Action (with English translation) for App. No. IL264100, dated Oct. 10, 2021, 10 pages.
Search Report and Written Opinion received in PCT Application No. PCT/IB2017/052811 dated Aug. 7, 2017.
Search Report and Written Opinion received in PCT Application No. PCT/IB2017/053667 dated Sep. 12, 2017.
Search Report and Written Opinion received in PCT Application No. PCT/IB2017/053713 dated Sep. 20, 2017.

* cited by examiner

RESULTS OF GCMS ANALYSIS

SUMMARY OF IDENTIFIED PEAKS (PROBABILITY > 50%) AND C-CONTAINING COMPONENTS

TABLE PERCENTAGE OF COMPONENTS IN PLASTIC PYROLYSIS IS SAMPLE

| NAME | PERCENTAGE |
|---|---|
| (1-METHYLETHYL)-BENZENE | 0.20% |
| 1,2,3,4-TETRAHYDRO-2,6-DIMETHYL-NAPHTHALENE | 0.84% |
| 1,2,3,4-TETRAHYDRO-2-METHYL-NAPHTHALENE | 0.29% |
| 1,2,3,4-TETRAHYDRO-NAPHTHALENE | 0.36% |
| 1-METHYL-4-(1-METHYLPROPYL)-BENZENE | 0.29% |
| 4-HYDROXY-4-METHYL-2-PENTANONE | 0.19% |
| 4-METHYL-NONAME | 0.23% |
| 4-METHYL-OCTANE | 0.16% |
| BENZENE | 1.18% |
| BENZONITRILE | 0.34% |
| BENZOPHENONE | 0.22% |
| BIPHENYL | 1.19% |
| ETHYLBENZENE | 1.72% |
| NAPHTHALENE | 1.09% |
| PROPYL-BENZENE | 0.29% |
| TOLUENE | 2.88% |
| C6 | 0.28% |
| C7 | 0.68% |
| C8 | 6.97% |
| C9 | 11.18% |
| C10 | 11.16% |
| C11 | 12.17% |
| C12 | 9.32% |
| C13 | 8.13% |
| C14 | 4.97% |
| C15 | 4.51% |
| C16 | 3.59% |
| C17 | 3.03% |
| C18 | 2.40% |
| C19 | 3.80% |
| C20 | 2.27% |
| C21 | 0.80% |
| C22 | 2.20% |
| C23 | 0.46% |
| C24 | 0.31% |
| C25 | 0.13% |
| C27 | 0.11% |
| C35 | 0.07% |

FIG. 22

SYSTEM AND PROCESS FOR CONVERTING WASTE PLASTIC INTO FUEL

CROSS-REFERENCE TO RELATED APPLICATIONS

This application is a divisional of U.S. application Ser. No. 15/641,471, filed Jul. 5, 2017, entitled, "SYSTEM AND PROCESS FOR CONVERTING WASTE PLASTIC INTO FUEL, which claims benefit of priority of U.S. Provisional Application No. 62/493,445, filed Jul. 5, 2016, entitled, "PROCESS FOR CONVERTING WASTE PLASTIC INTO FUEL". The entire contents and disclosure of this patent application is incorporated herein by reference in its entirety.

This application makes reference to U.S. Provisional Application No. 62/318,178, filed Jun. 21, 2016, entitled "CHAR SEPARATOR"; U.S. application Ser. No. 15/477,312, filed Apr. 3, 2017, entitled "CHAR SEPARATOR"; U.S. Provisional Application No. 62/319,768, filed Jun. 21, 2016, entitled "BAG PRESS SEPARATOR"; U.S. patent application Ser. No. 15/479,560, filed Apr. 5, 2017, entitled "BAG PRESS SEPARATOR"; U.S. patent application Ser. No. 15/054,903, filed May 12, 2016, entitled "CYCLONIC CONDENSING AND COOLING SYSTEM"; International Application No. PCT/IB2017/052811, filed May 17, 2017, entitled "CYCLONIC CONDENSING AND COOLING SYSTEM"; U.S. patent application Ser. No. 15/062,319, filed Jul. 8, 2016, entitled "HEATED AIRLOCK FEEDER UNIT"; International Application No. PCT/IB2017/053667, filed Jun. 20, 2017, entitled "HEATED AIRLOCK FEEDER UNIT"; U.S. patent application Ser. No. 15/593,579, filed May 12, 2017, entitled "CYCLONIC CONDENSING AND COOLING SYSTEM"; U.S. patent application Ser. No. 14/757,227, filed Dec. 8, 2015, entitled "HEATED AIRLOCK FEEDER UNIT"; U.S. Provisional Application No. 62/089,617, filed Dec. 9, 2014, entitled "FEEDING REACTOR/EXTRUDER"; U.S. Provisional Application No. 62/089,628, filed Dec. 9, 2014, entitled "CYCLONIC CONDENSATION SYSTEM"; U.S. patent application Ser. No. 14/964,521, filed Dec. 9, 2015; U.S. patent application filed Dec. 9, 2015, entitled "HEATED AIRLOCK FEEDER UNIT"; U.S. application filed Dec. 9, 2015, entitled "CYCLONIC COOLING SYSTEM"; U.S. Provisional Application No. 62/270,565, filed Dec. 21, 2015, entitled "BAG PRESS FEEDER"; U.S. Provisional Application filed Dec. 13, 2015, entitled "CHAR SEPARATOR"; U.S. Provisional Application No. 62/089,635, filed Dec. 9, 2014, entitled "RADIANT AIR CHILLER"; U.S. application Ser. No. 15/628,844, filed Jun. 21, 2017, entitled "CHAR SEPARATOR AND METHOD"; International Application No. PCT/IB2017/053713; entitled "CHAR SEPARATOR AND METHOD"; U.S. application Ser. No. 15/628,922, filed Jun. 21, 2017, entitled "BAG PRESS FEEDER ASSEMBLY"; International Application No. PCT/IB2017/053715, entitled "BAG PRESS FEEDER ASSEMBLY". The entire contents and disclosures of these patent applications are incorporated herein by reference.

BACKGROUND

Field of the Invention

The present invention relates generally to a device for heat exchanged technology. More particularly, it relates to a device for economically condensing hydrocarbon vapors in a renewable energy plant.

Background of the Invention

Convention systems for producing fuel in a pyrolysis process have been utilized. Examples of known processes include U.S. Pat. No. 8,696,994 to Miller, U.S. Pat. No. 8,344,195 to Srinakruang, and U.S. Pat. No. 6,534,689 to Stankevitch. These patents teach processes that use catalyst cracking techniques that depolymerize the hydrocarbon chains and then produce fuel once the plastic is vaporized (Miller, Srinakruang, and Stankevitch).

Plastic pyrolysis systems currently use large rotating vessel and large kiln apparatuses. A challenge with using large vessels is their inability to fill and discharge continuously as these systems use a batch fill to insert plastic and then heat the product with sealed ends. Although claiming to be a continuous system, they generally utilize multiple units; as one is being filled, another is emptied. Therefore, the process is not truly a continuous process but an overlapping batch process.

A second problem with large vessels of conventional system includes drawbacks with the sealing mechanisms. Sealing mechanisms expand due to heat and pressure. Due to this expansion, oxygen can leak into the vessels creating a fire hazard. A third challenge with the current known art is that the start of time of the pyrolysis reaction is prolonged due to the fact that the vessel needs to be started up when it is cold and the oxygen needs to be evacuated before heating. This is an extremely time intensive process. Another problem with prior art systems includes vessels that require a cool down period before cleaning, for example, in order to access the interior structures. Extraction of the fuel and char is also conducted in a batch operation. The char removal process involved with the prior art is cumbersome and extremely dirty because of the nature of cleaning as the vessel collects char on the wall. This char has to be removed before the next batch is processed. This is very time consuming and expensive due to the low efficiency of combination of heating, cooling, and cleaning.

Other systems use vats that are very similar in nature as the one described above as they must be purged of oxygen and filled with plastic then sealed, then heated, and then cleaned. These machines require large, highly machined surfaces for a good seal. The batch heating and cooling requires large amounts of energy to achieve the pyrolysis process in a timely manner Manual labor is used in the cleaning process. This is expensive and can be hazardous. Other plastic systems are designed for a particular type of plastic only. The inability to switch from a certain homogenous stream to a mixed plastic stream requires re-configuration of the equipment. Different grades, sources, and streams of plastic have different densities and different textures that effect handling parts differently. Plastic bags, film, and light density plastics present a problem to standard shredders and feeding mechanisms due to the wrapping effect and bridging that occurs. Wrapping occurs as the plastic bags build up around the cutting shaft eventually stopping the shredder mechanism. Although knife cutting devices will work to resolve this problem, they will not allow for hard contaminates to pass through the cutting blades. The hard contaminates will damage the cutting edge and even stop the cutter rotation.

Thus, there is a need for producing a more efficient re-useable energy apparatus that provides capability for optimizing usable and re-usable fuel vapors. There is also a need for providing improved systems that reduce and/or eliminate contaminants without employing added expenditures of additional equipment or additional filtering processes for achieving the same.

SUMMARY

According to first broad aspect, the present invention provides an apparatus for processing reusable fuel comprising: a continuous material supply assembly; a heated airlock feeder configured to continuously receive and process the material supply received therein; a reactor configured to receive the processed material from the heated airlock feeder; and a vapor refining system configured to process vapor supplied by the reactor. The apparatus may comprise a char disposal system configured to eliminate char from the reactor. The apparatus may also comprise a thermal expansion system configured to allow thermal expansion of the reactor. A cooling system may be configured to receive processed fuel from the reactor.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 22 is an exemplary chart listing the percentage of components in a plastic pyrolysis sample according to one embodiment of the present invention.

DETAILED DESCRIPTION OF THE INVENTION

Definitions

Figure 1:
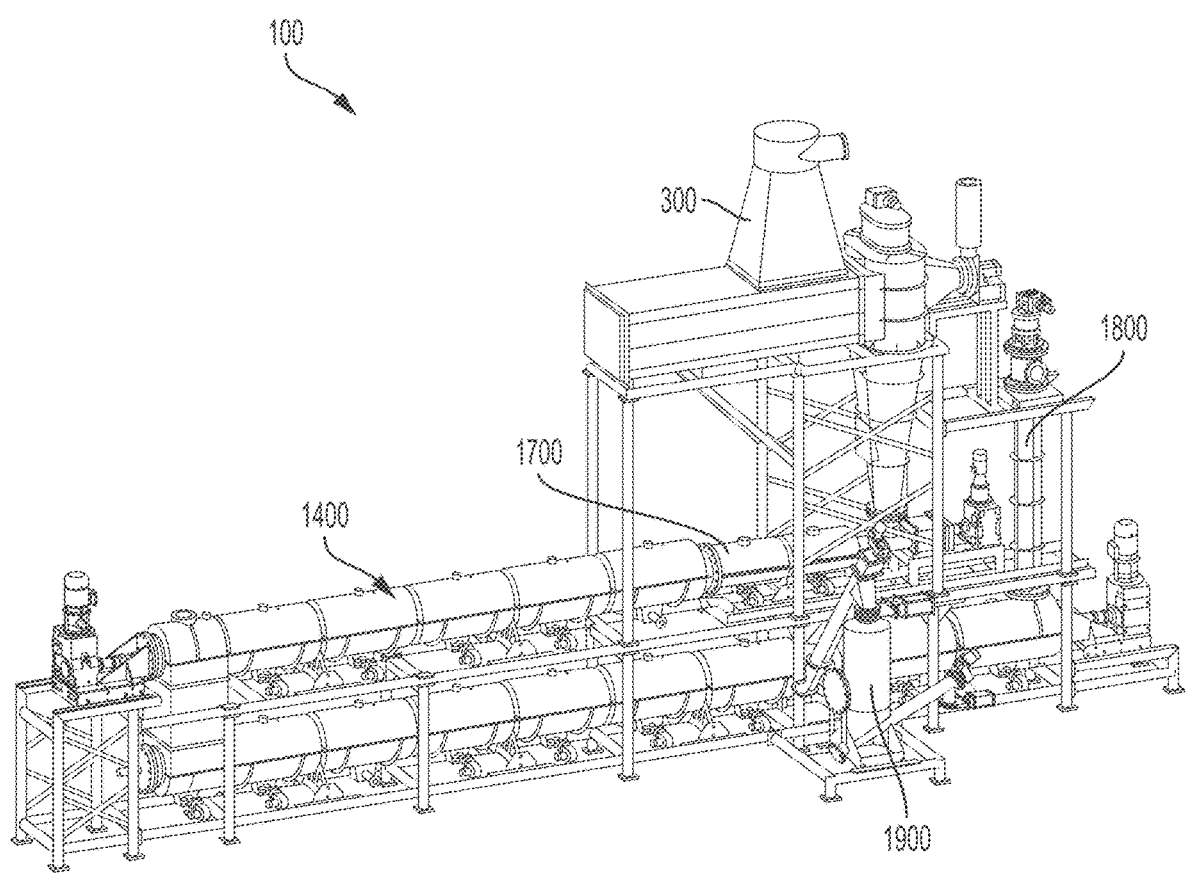
FIG. 1 illustrates reactor section for a re-useable energy apparatus according to one embodiment of the present invention.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present invention, the term "comprising", the term "having", the term "including," and variations of these words are intended to be open-ended and mean that there may be additional elements other than the listed elements.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing FIGS. may be flipped over, rotated by 90° in any direction, reversed, etc.

For purposes of the present invention, a value or property is "based" on a particular value, property, the satisfaction of a condition, or other factor, if that value is derived by performing a mathematical calculation or logical decision using that value, property or other factor.

For purposes of the present invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For the purposes of the present invention, the term "ambient air temperature" refers to generally to the temperature of the surrounding environment and more particularly the temperature of the surrounding environment of the disclosed cyclonic condensing and cooling system.

For the purposes of the present invention, the term "bubbler" refers to an apparatus that directs gas flow beneath a liquid in which gas bubbles through a liquid to filter, scrub and/or dissolve out harmful gasses/pollutants. In addition, the bubbler may serve as a back flame arrestor or a back pressure regulator.

For the purposes of the present invention, the term "coil condenser" refers to a coiled tube utilized as the basic energy exchange medium between a vapor to be condensed and a liquid to be condensed. Typical surrounding liquids that may be utilized to achieve lower freezing points or inhibit rust build up may include water or water mixed with glycol.

For the purposes of the present invention, the term "chiller" refers to an external refrigeration unit used to lower/reduce the temperature of a liquid used in condensation to be subsequently pumped such as through a coil condenser.

For the purposes of the present invention, the term "cyclone cooler" refers to a non-electric drawing condensing device that rotates air mass in a cyclonic rotation. In application the cyclonic rotation may include a rapid inward circulation of air masses about a low-pressure center.

For the purposes of the present invention, the term "daisy chain configuration" refers to an assembly wherein components are connected in sequence. The sequential connection may include a series configuration of connections of several components wherein one component is connected to the next component in line.

For the purposes of the present invention, the term "de-stoner hood" refers to a device that separates solid heavy objects from entering a prescribed area. In one exemplary embodiment, the de-stoner hood may be configured to prevent heavy objects like steel or aluminum from entering into the bag press hopper of the disclosed embodiment.

For the purposes of the present invention, the term "fin" refers to a thin component or appendage attached to a larger body or structure. Fins typically function as foils that produce lift or thrust, or provide the ability to steer or stabilize motion while traveling in water, air, or other fluid media. Fins are also used to increase surface areas for heat transfer purposes.

For the purposes of the present invention, the term "heat exchanger" refers to a device designed to transfer heat from one matter to another. In application, the heat exchanger may be utilized to transfer heat between a solid object and a fluid (a liquid or a gas), or between two or more fluids. The fluids may be separated (such as by a solid wall) to prevent mixing or they may be in direct contact.

For the purposes of the present invention, the term "identical" refers to being similar in every detail; exactly alike.

For the purposes of the present invention, the term "flash point" of a volatile material refers to the lowest temperature at which vapors of the material will ignite when given or exposed to an ignition source.

For the purposes of the present invention, the term "fractionation" refers to separating of a mixture of hydro-carbon chains into a group of carbon chains or fractionations.

For the purposes of the present invention, the term "naphtha" refers to any of several highly volatile, flammable liquid mixtures of hydrocarbons distilled from petroleum, coal tar, and natural gas and used as fuel, as solvents, and in making various chemicals. Also called benzine, ligroin, petroleum ether, white gasoline.

For the purposes of the present invention, the term "series" refers to a number of things coming one after another in spatial or temporal succession.

For the purposes of the present invention, the term "scrubber" refers to a device used to remove and/or dissolve undesirable pollutants from a gas or exhaust stream.

For the purposes of the present invention, the term "substantially" refers to to a great or significant extent; for the most part; essentially.

For the purposes of the present invention, the term "thermal cracking" refers to process used to break down carbon chains of petroleum compounds so that a desired carbon compound is achieved. This process may involve high heat, distillation, re-boiling, and energy intensive cooling processes.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

This application relates the process by which waste plastic can be turned into fuel by the use of pyrolysis in a system that is able to continuously feed shredded plastic, plastic bags, and other plastic waste into an air tight pyrolysis apparatus requiring no catalyst to produce fuel. The process allows for continuous fuel segregation, discharge of Char, as well as the collection and use of generated syn-gas to supply process heat fuel.

This process overcomes the problems described above with the prior art processes due to its ability to handle heavy (e.g., a dense plastic like a recycling bin) and light plastic (e.g., less dense plastic like a plastic shopping bag) without the need to reconfigure the equipment, ability to operate in continuous use, and obtain higher efficiencies of heat exchange. A continuous flow of plastic will enter the system with a continuous flow of char being collected and fuel being continuously produced. Electricity may be generated from any excessive syn-gas not used by the burners to heat the reactor, reducing the operating cost as it does not involve batch heating, cooling and cleaning of the reactor. The process is a semi-closed loop operation. External heat is applied in the first hour and a half to two hours of processing and can be in the form of natural gas, propane, diesel, and electricity. The term is referred to as the "Start-Up Time". Once the machine has been able to run continuously during the start-up phase the invention is able to operate continuously on its own gas by-product. This gas is referred to as "synthetic gas" or "syn-gas."

In the disclosed system, syn-gas may be considered a by-product or waste gas that is produced when plastic material is thermally cracked into shorter carbon chains. The aforementioned disclosed process produces condensed liquids or fuels (e.g., diesel and gasoline) and non-condensable gas like a natural gas or syn-gas. The syn-gas may be routed back to burners of the disclosed system to heat components of the system as described herein. Turning to FIG. 1, a reactor section 100 for a re-useable energy apparatus is illustrated. Reactor section 100 employs a supply feeder or bag press feeder assembly 300 to feed plastic material into reactor 1400 to heated airlock feeder 1700. Char is dispelled through a char discharge system 1900. Vapors produced within reactor section 100 may continue throughout the reactor and be collected through an ash separator tower or char separator 1800.

Figure 10:
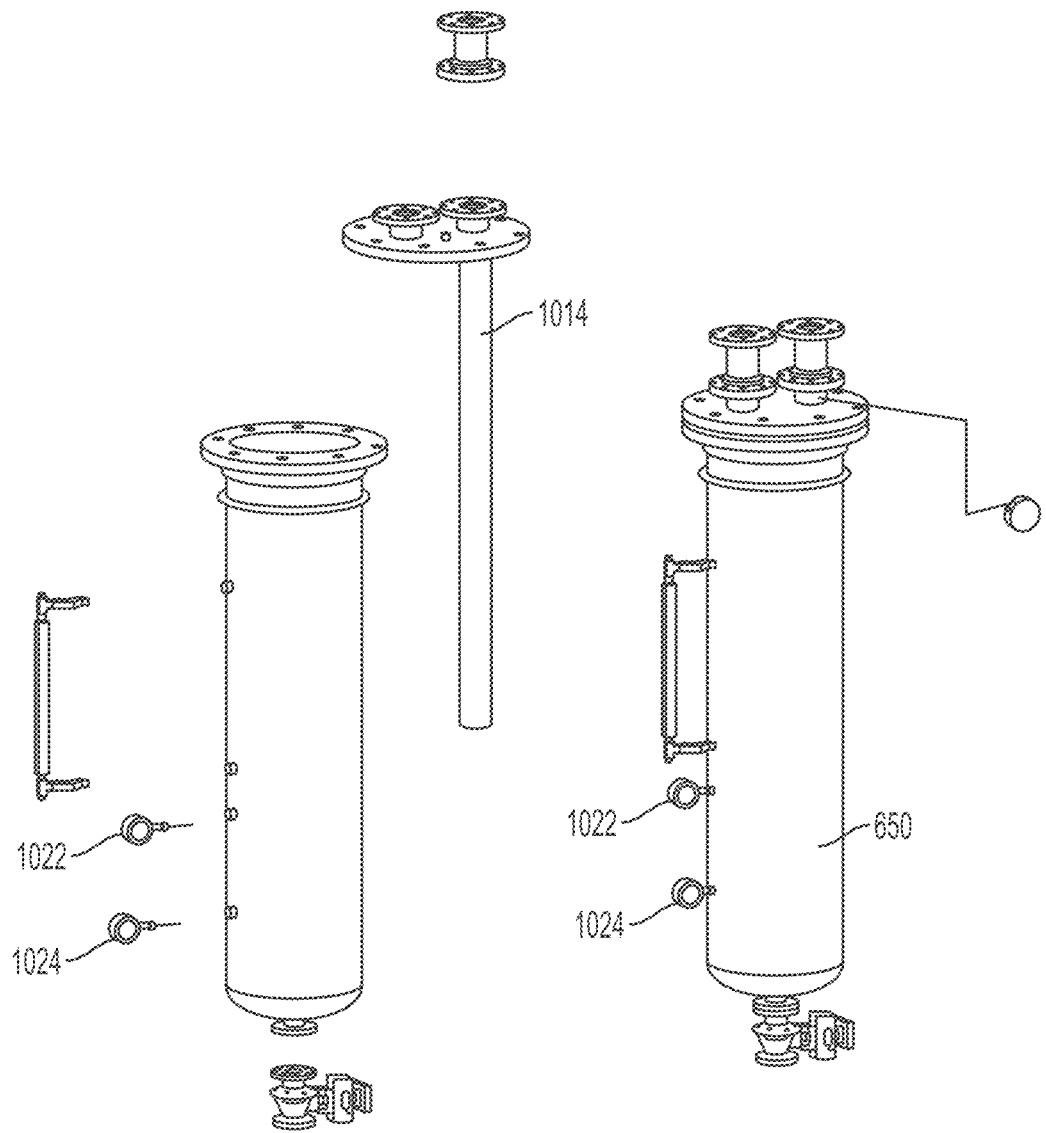
FIG. 10 illustrates an assembled and partially assembled view of a scrubber/bubbler unit according to one embodiment of the present invention.

A duel gas burner depicted in FIG. 10 is able to use commercial gas and syn-gas produced by the disclosed system as heating fuel. Alternating solenoid valves depicted on FIG. 10 at 1 and 2 allow for dual gas control.

Bag Press Separator

Processing plastic type materials, such as plastic bags, in conventional prior art systems is known to be problematic. For example, due to the characteristically light weight nature of the plastic type materials, difficulties exist for processing and feeding the same into an extruder. For instance, plastic bag materials possess an extremely low non-compressed weight averaging three pounds per cubic foot and, due to their aforementioned light weight characteristics, plastic bag materials have a tendency to spring open, float when moved and form a very large bridge when stored.

Thus, the prior art does not readily provide continuous feeding and conveying of heated plastic materials. Additionally, the prior art does not easily provide systems for addressing recycled plastic materials for conversion into to refined fuel products. Furthermore, prior art systems prove problematic in achieving an air lock for feeding and manipulating heated plastic materials for subsequent processing. Therefore, there is a need for producing a more efficient re-useable energy apparatus that provides capability for processing plastic type materials into usable and/or re-usable fuel products.

Plastic waste material may be shredded and fed, for example, into a reactor (e.g., a pyrolysis reactor). Applying heat above 350 degrees Celsius will cause the shredded plastic material to melt and vaporize. Ultimately, an upstream reactor may utilize back pressure to assist in the thermal cracking of carbon chains present in the plastic material to produce a refined fuel or re-useable fuel for subsequent use.

This application relates to an apparatus that may be part of a re-useable fuel processing unit. In one disclosed embodiment, an apparatus assembly may be used to feed plastic material into a reusable fuel processing unit including a pneumatic feed having a blower 302 (FIGS. 3 and 4) as a power source. It should be appreciated that the blower 302 may be powered by the heat used to melt and vaporize the shredded plastic. The assembly may also include a screened air outlet, a plurality of press augers, a pinch conveyer system, a de-stoner hood, a receiver hopper, a low and high level indicators, ram, press screw inlet, pneumatic air cylinder, bag press inlet, outlet, and amp monitor. The pneumatic feed may be configured to move the plastic material at a fixed rate to the press feed receiver. The blower 302 is used as a power source in which air from the blower 302 is pulled through a screened hood. The screened air outlet may be substantially configured as the same identical shape as the bag press body. The press screw augers wipe the screen as they rotate allowing air flow through the bag press, ram, and receiver. A pinch conveyer system collects loose plastic material(s), such as plastic bags, and compresses them into a de-stoner hood (having a comparatively large body) allowing compressed plastic material(s) (e.g., plastic bags) to expand when disposed inside the de-stoner hood. The plastic material(s) (e.g., plastic bags) are conveyed into a receiver hopper thereby triggering a level indicator and starting a ram mechanism. The ram acts as an air cut-off gate that will push material into a press screw inlet. Once the ram starts to move, the pinch conveyer stops, thereby preventing material from entering the receiver hopper. Thus, the ram also acts as a cut-off gate. In a disclosed embodiment, the ram is pushed by a pneumatic air cylinder towards the bag press inlet. The ram may be configured to be larger than the receiver opening and designed with substantially the same identical matching face as the press screw augers. Full details of described embodiments are provided below.

Figure 3:
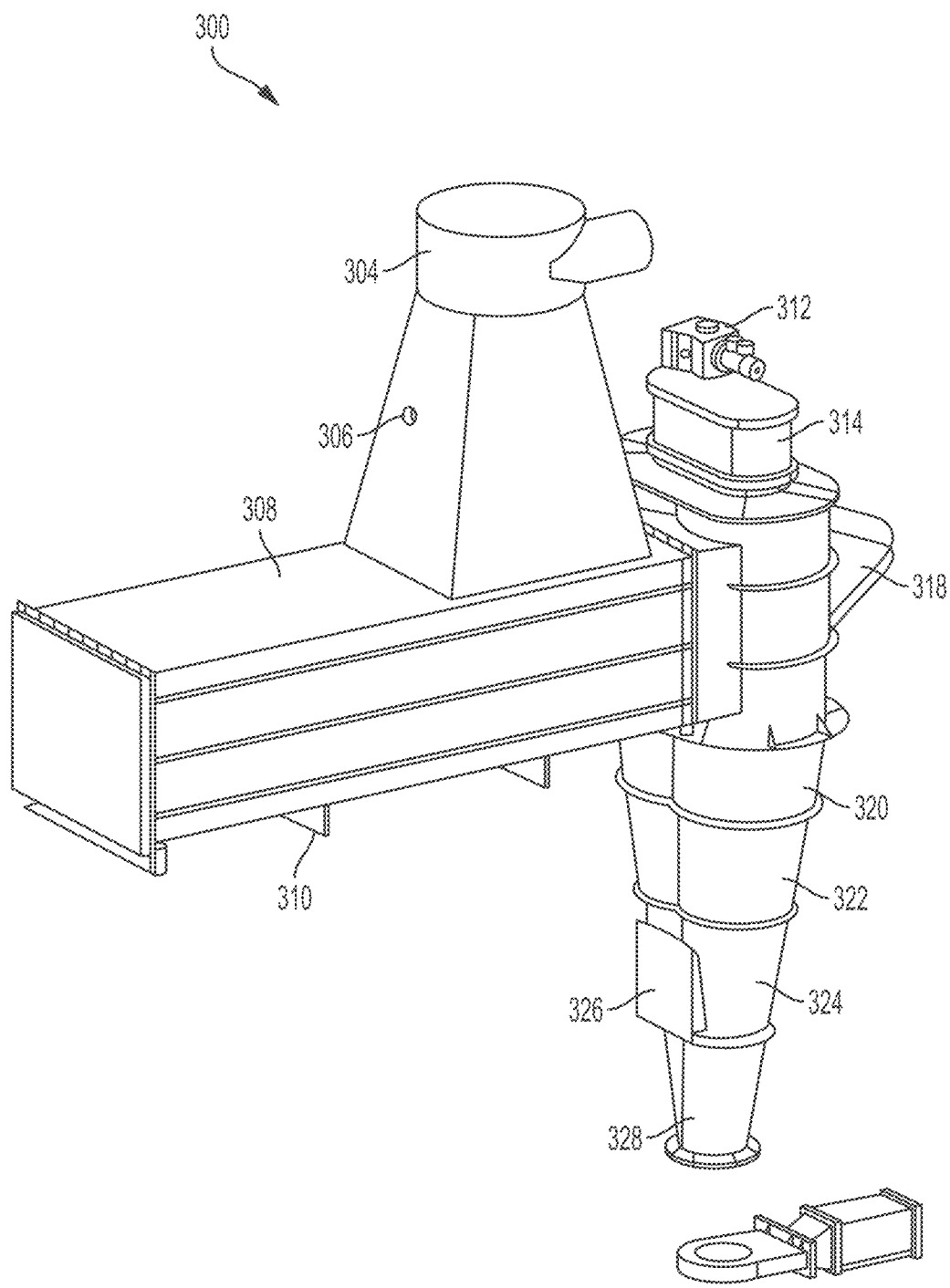
FIG. 3 illustrates an assembled view of a bag press feeder assembly according to one embodiment of the present invention.
Figure 4:
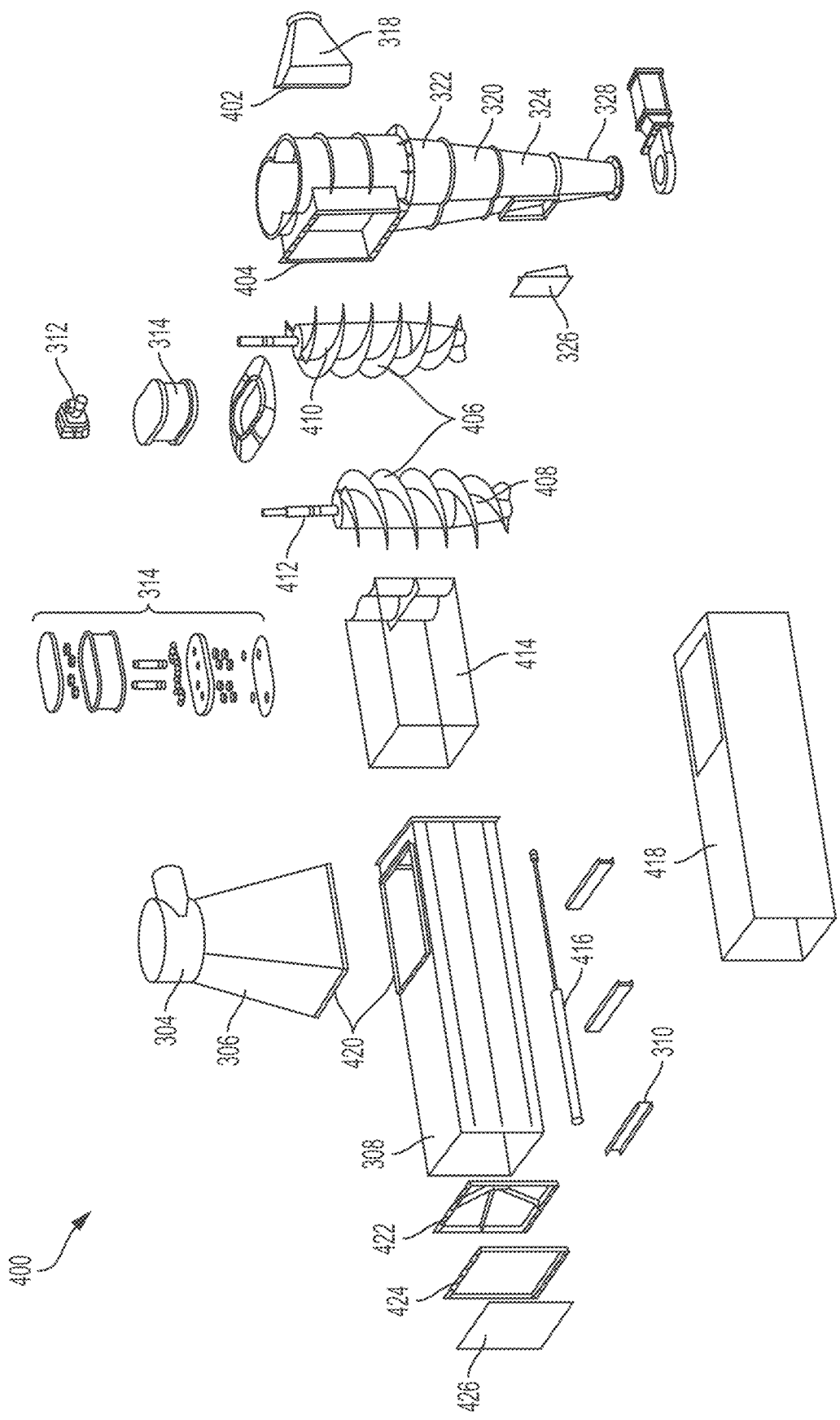
FIG. 4 illustrates an exploded view of the bag press feeder assembly of FIG. 2 according to one embodiment of the present invention.

Turning to FIG. 3, a disclosed bag press feeder assembly 300 may be employed as part of a re-useable fuel processing unit that is readily configured for continuously feeding recycled plastic materials and heating the same for subsequent processing into a fuel source, as described below. FIG. 4 illustrates an exploded view 400 of bag press feeder assembly 300 according to one disclosed embodiment.

Plastic bag type materials are known to be difficult to process feed into conventional prior art systems due to the inherent light weight nature of their material design. Such plastic bag type materials may possess a very low non-compressed weight averaging, for example, approximately three pounds per cubic foot. Furthermore, such aforementioned materials may have a tendency to spring open, float when moved and form a very large bridge when stored. Embodiments of the disclosed design address and solve previous problems related to plastic bag conveying, receiving, storing and feeding and as described above.

The disclosed bag press feeder assembly may be constructed from a variety of materials. Carbon steel may typically be employed in the disclosed design, but other alloys may be applied if required by certain conditions. Stainless steel or aluminum may also be employed within a construction design. Turning to FIGS. 3 and 4, the design of the bag press feeder assembly 300 allows light materials to be collected and compressed into a higher density material. The inlet 402 of the unit is tangential to help allow the separation of the conveying air from the material Eliminating air from within the disclosed design is important to remove or drastically reduce opportunities for combustion in an otherwise flammable working environment.

The plastic material being collected into the receiving hopper 304 is built to a point that a photo eye will indicate the level of material. This indicator will transmit a signal to a controller to stop the flow of material when capacity is indicated. In one disclosed embodiment, a ram press is configured to pull material from receiving hopper 304 into a press chamber 308, as material is lowered below the photo eye, more material is conveyed into receiving hopper 304.

Plastic material may enter in either a clockwise or counterclockwise rotation based on a required design. As plastic material enters and circulates in the upper section of the receiver, it drops, due to gravity, into the lower section. This section is designed to allow material to continuously fall and not bridge. The upper diameter is smaller than the base discharge area creating a negative wall that forces any materials that would swell and cause bridging to be pushed in a downward direction following the sidewall shape.

Below the receiving hopper depicted on FIG. 3 at 304 is a square housing lined with ultra-high-molecular-weight polyethylene (UHMW) or low friction plastic, that has a void filling ram device 414 (FIG. 4) inside. In one disclosed embodiment, the housing is configured as a square geometry. Ram device 414 is powered by a pneumatic air cylinder 416. Ram device 414 or plug, travels inside the polymer liner 418 in a linear direction. The chamber 308 is of a prescribed shape (e.g., a generally square shape profile) with external support bars and matching connection flanges or seal flanges 424 and an inlet flange 422. A polymer liner, UHMW or nylon, is used to reduce the drag of the ram plug 414 as it is pushed.

Air cylinder 416 is mounted to a support frame at the tail of the chamber depicted on FIG. 4 at 308. The other end of the air cylinder is connected inside ram plug 414, e.g., to a plate that matches the auger's profile. The back end of the chamber 308 is sealed to prevent air leakage with a seal plate 426. By sealing the chamber, air movement is allowed to enter into the receiving hopper at the product inlet port 402, through chamber 308, through the press body, and then through the air discharge transition hood 318 and into a fan that can be located remotely.

The movement of ram plug 414 slides beyond the opening depicted at 420, allowing material to fall from the receiving hopper 304 into chamber 308 through the opening connecting flange 422. Ram plug 414 is pulled to the rear of chamber 308 which allows for a large volume of material to drop in front of the ram to be subsequently guided and pushed into the press device. Pneumatic cylinder 416 extends and pushes Ram plug 414 into an opening 404 of the bag press feeder 322.

The bag press feeder 322 consists of a press body or vertical double body 324 with a matching inlet flange 404 and an air discharge transition hood 318. Bag press feeder 322 connects to a support frame depicted 310 and to a lower hopper that comprise split eccentric reducers all of which may be welded to match up to the body and to the single diameter discharge flange. Within press body 324, counter rotating double flighted augers 408, 410 may be disposed. Augers 408, 410 are configured to receive and grab incoming material and manipulate the same to push the material to the lower hopper.

Augers 408 and 410 are located in a drum measuring approximately fourteen inches in diameter for each auger with heavy screw flight material welded solidly around the drum. The drum is designed as a lower tapered cone to match the bag press body shape. The drive shaft at 412 is supported and welded through the drum and extends into the gearbox 314. Augers 408 and 410 are constructed where one has right-hand rotation the other has left-hand rotation. The left-hand and right-hand augers overlap. Due to this overlap augers 408, 410 act as self-cleaning mechanisms while pushing the plastic material downward into the lower section of the bag press feeder hopper. The pressure within the bag press feeder 322 increases as material is forced from the large opening at the top of the bag press feeder into the lower small opening of the bag press feeder. An access door 326 is a plug type door used to maintain the internal shape. Plastic material is pulled into the receiving hopper at the product inlet 402 by a fan located on the backside of a screened air outlet transition hood 318.

Main augers 408 and 410 may be configured as drum style augers. The concept of the drums is to have a large circumference preventing materials like plastic bags from wrapping completely around the drum. The disclosed design, along with overlapping, counter rotating auger flights prevents material from wrapping around the drum augers 408, 410. The base of the drum augers has two flights ending 180 degrees apart due to the double flights. Because the drum has flights on both sides that are 180 degrees apart, the force pressure downward does not deflect the drum auger when compressing material below.

As best illustrated in FIG. 4, a drive system may be provided to connect to and control augers 408, 410. The drive system may include a gearbox or drive mechanism 314 that may be powered, for example, by a helical gear motorized drive box or motor drive 312. Drive mechanism 314 may be maintained, for example, within a drive housing. From inside the drive housing exits transfer shafts 434, spur gears 436 seals and bearings. The use of a multitude of spur gears 436 (e.g., four spur gears) reduces the overall size of the gearbox 314. In operation, the centerline difference between the two augers 408, 410 would otherwise require two large gears to meet in the middle, where the use of the four smaller spur gears makes the box smaller while maintaining equal force on all of the shafts.

Accordingly, in one disclosed embodiment, a pneumatic feed is used in the disclosed design to both move the plastic material at a fixed rate to the press feed receiver 304 and to remove any heavy objects. A standard blower 302 (FIGS. 3 and 4) may be used for the power source. The air from the blower 302 is pulled through a screened hood 318 on a back side of a material press body or bag press body 320. In one disclosed embodiment, screen hood 318 tapers generally inwardly from a connection point onto a screened air outlet transition 402 may be configured as the same shape as the bag press body depicted at 99 creating a very small gap between augers 408 and 410 and the screen 402. Augers 408 and 410 wipe the screen 402 as it rotates, allowing for air flow through the bag press, ram and receiver. Screen 402 maintains plastic material particles within bag press body 320 thereby preventing them from exiting at hood 318. However, the design of the screen 402 also allows airflow through the bag press into the bag press body 320 and out through hood 318 to eliminate and/or greatly reduce an otherwise combustible operating environment.

A conveyor system, such as a pinch conveyor system, may be employed to collect plastic material, such as loose bags, and compress them into a size that will be feed into a de-stoner hood 306. De-stoner hood 306 has a large body and allows the compressed plastic bag material to expand a little once disposed within inside the de-stoner hood. The bags are then conveyed into the receiver hopper 304 into the ram housing 308. The bags fill receiver hopper 304 to a fixed point triggering a level indicator. This will start ram 414 disposed below to push material into the press screw inlet 504. As ram 414 starts to move, the pinch conveyor stops to prevent further material from entering the receiver hopper 304. Ram 414 also acts as an air cutoff gate as it covers the receiver hopper opening 420. Receiver 304 has a negative wall design. The incoming material expands when it is inside the receiver 304. The hopper gets larger as its gets closer to the ram inlet 420. Ram 414 is pushed by a pneumatic air cylinder 416 to the bag press inlet 504, and at the same time cuts off the material flow due to its shape as the ram body is larger than the receiver opening 420 disposed above the ram body. Ram 414 may be configured to have a substantially identical face with the same shape and/or size as the press screw augers 408 and 410 allowing material to be pulled into the press body depicted 99. The plastic material is forced down the augers 408 and 410 by the metal flights 406. Disclosed embodiments provide one left hand flight auger 408 and one right hand flight auger 410 in the press body 320.

As more and more plastic material, such as plastic bags, is collected into the bag press, the plastic material is forced down and is compressed. As the plastic material (e.g., plastic bags) builds up inside the bag press body 320, the plastic material is pushed down where the diameter of the hopper gets smaller and smaller towards a compression area at outlet 328. The increase in material and decrease in area creates a higher density of plastic material and creates a pressurized seal.

The bag press motor drive 312 may include an amp monitor. The amp monitor may be set at a prescribed level to signal when the bag press is full and at the correct pressure. Depending upon the threshold level of the amp monitor, the motor drive is controlled to operate or not operate based upon a prescribe value or amp range. When the material is allowed to discharge, the pressure is reduced in the compression area at outlet 328 and the computer may be initialized to start the fill process while continuing to monitor the motor amps.

Figure 5:
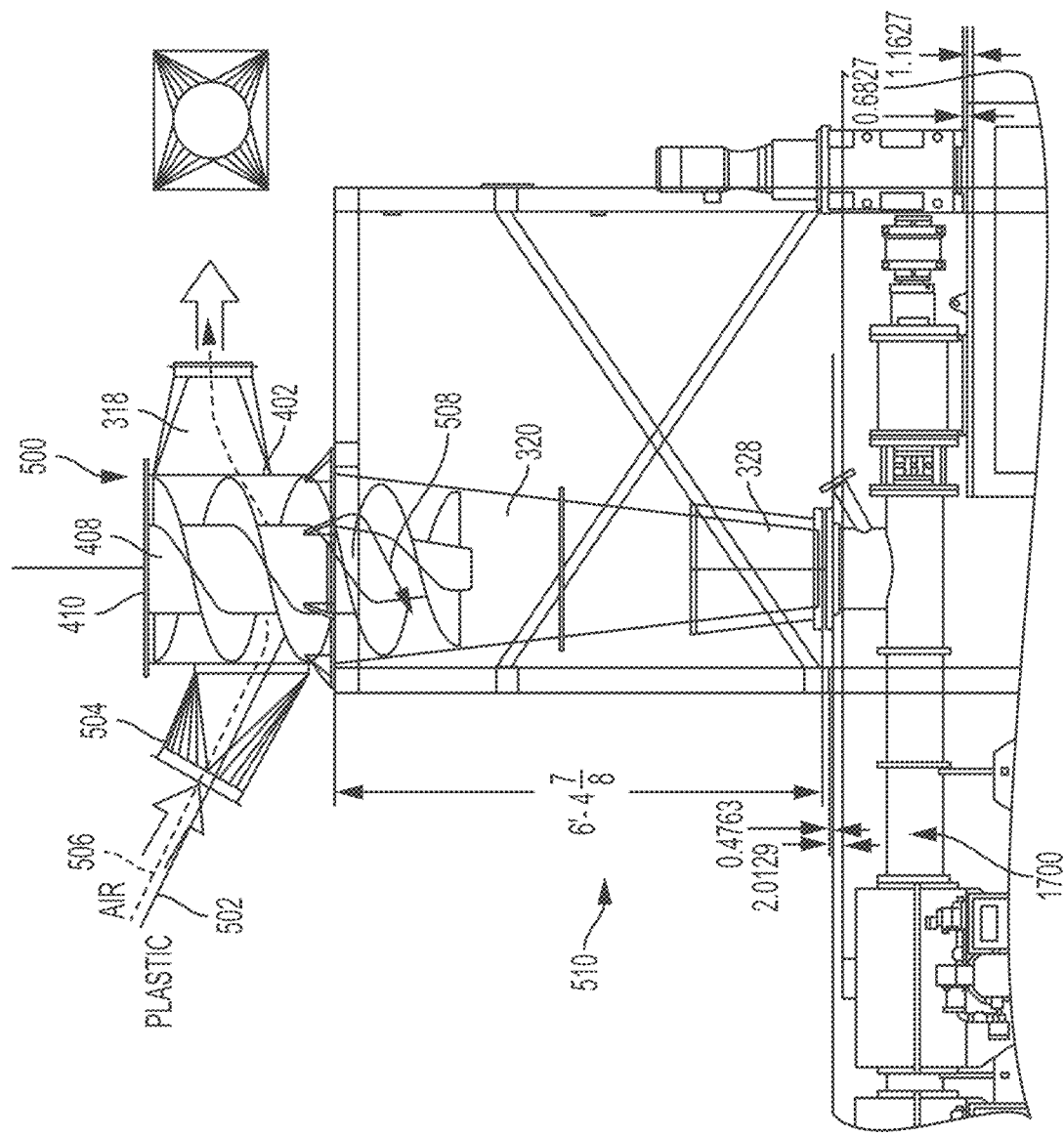
FIG. 5 illustrates an alternate embodiment of a bag press feeder assembly according to another embodiment of the present invention.

Turning to FIG. 5, an alternate embodiment 510 of a bag press feeder assembly 500 is shown in connection with heated airlock feeder 1700. A negative vacuum pressure is created within bag press body 320 to draw plastic material within. Accordingly, plastic material 502 is feed into inlet 504 by airstream 506. The disclosed configuration receives airstream 506 into inlet 504 of bag press body 320 towards auger 408 (410) and through screen 402 and hooded outlet 318.

A screened air outlet transition 402 may be configured as the same shape as the bag press body depicted at 99 creating a very small gap between augers 408 and 410 and the screen 402. Augers 408 and 410 wipe the screen 402 as it rotates, allowing for air flow through the bag press, ram and receiver. Screen 402 maintains plastic material particles within bag press body 320 thereby preventing them from exiting through screen 402 and hooded outlet 318. However, the design of the screen 402 also allows airflow through the bag press into the bag press body 320 and out through screen 402 and hooded outlet 318 to eliminate and/or greatly reduce an otherwise combustible operating environment.

By design, plastic material 502 is urged towards auger 408 (410) via airstream 506 and the back pressure created within bag press body 320. As more and more plastic material 502 is collected into bag press body 320, plastic material 502 is forced in downward direction 508 as it continues to compress. As plastic material 502 builds up inside bag press body 320, plastic material 502 is pushed downwardly where the diameter of the hopper gets smaller and smaller towards the outlet. The increase in material and decrease in area creates a higher density of material and creates a pressurized seal.

Cyclonic Condensing and Cooling System

Existing designs of convention systems often require an inordinate amount of space to accommodate the structure of the cooling system. In addition, such conventional cooling system configurations merely produce a low surface area inside the condensers thereby limiting their efficiency. Furthermore, the aforementioned designs do not allow for easy linkage and communication of its components such as in a daisy-chain configuration design. As a result, condensation of usable and re-useable fuel vapors may not be optimized. Accordingly, prior art designs may lead to char build-up and plugging of internal tubes within the condenser thereby reducing effectiveness of the system.

Thus, there is a need for producing a more efficient heat exchange cooling system that provides capability for optimizing usable and re-usable fuel vapors. There is also a need for providing improved systems that reduce contaminants without employing added expenditures of additional equipment (such as external heat sources, electrical input or cooling media apparatus) for achieving the same.

Fractionation includes the separating of a mixture of hydro-carbon chains into a group of carbon chains or fractionations. Thermal cracking is the process used by refineries to break down carbon chains of petroleum compounds so that the desired carbon compound can be achieved. This process typically involves high heat, distillation, re-boiling, and energy intensive cooling processes. This application discloses an invention that will condense vapor produced by a reactor (e.g., a pyrolysis reactor). In doing so, the disclosed system utilizes a standard cyclone; a plurality of specialized cascading cyclones with internal cyclonic rotation fins that force incoming vapor to maintain a fixed amount of rotation regardless of the vapor's velocity, heat sinks that increase condensation, reversing fins that force gases to reverse direction inside the cyclone decreasing vapor velocity to increase heat loss; a main collection tank that allows for the controlling of the fuel flash point; a compact low temperature coil cooler that uses 100 percent of the cooling surface that allows for the production of higher quality fuel; and, bubblers/scrubbers that produce back pressure into the pyrolysis reactor.

The disclosed subject matter improves on heat exchanged technology by providing a more efficient heat exchange cooling system that provides capability for optimizing usable and re-usable fuel vapors. Such vapors may be captured and utilized on any device able to run on gaseous fuel such as any non-condensable petroleum fuel.

In addition, the disclosed subject matter discussed herein differs from the prior art as it employs modified rotation fins, internal cyclone heat sinks, forced gas direction reversal inside of each cyclone, the ability to control fuel flash points without an external heat source, separation of the collected fuels without an external het source, and compact low temperature coil cooler that uses one hundred percent of the cooling surface.

Furthermore, the disclosed subject matter employs a daisy-chain design configuration so that the condensation of usable re-useable fuel vapors in optimized. The disclosed cyclonic condensing and cooling system is part of a re-useable energy technology and the prior art designs would lead to Char build-up and plugging of the tubes within the condenser reducing effectiveness.

Figure 6:
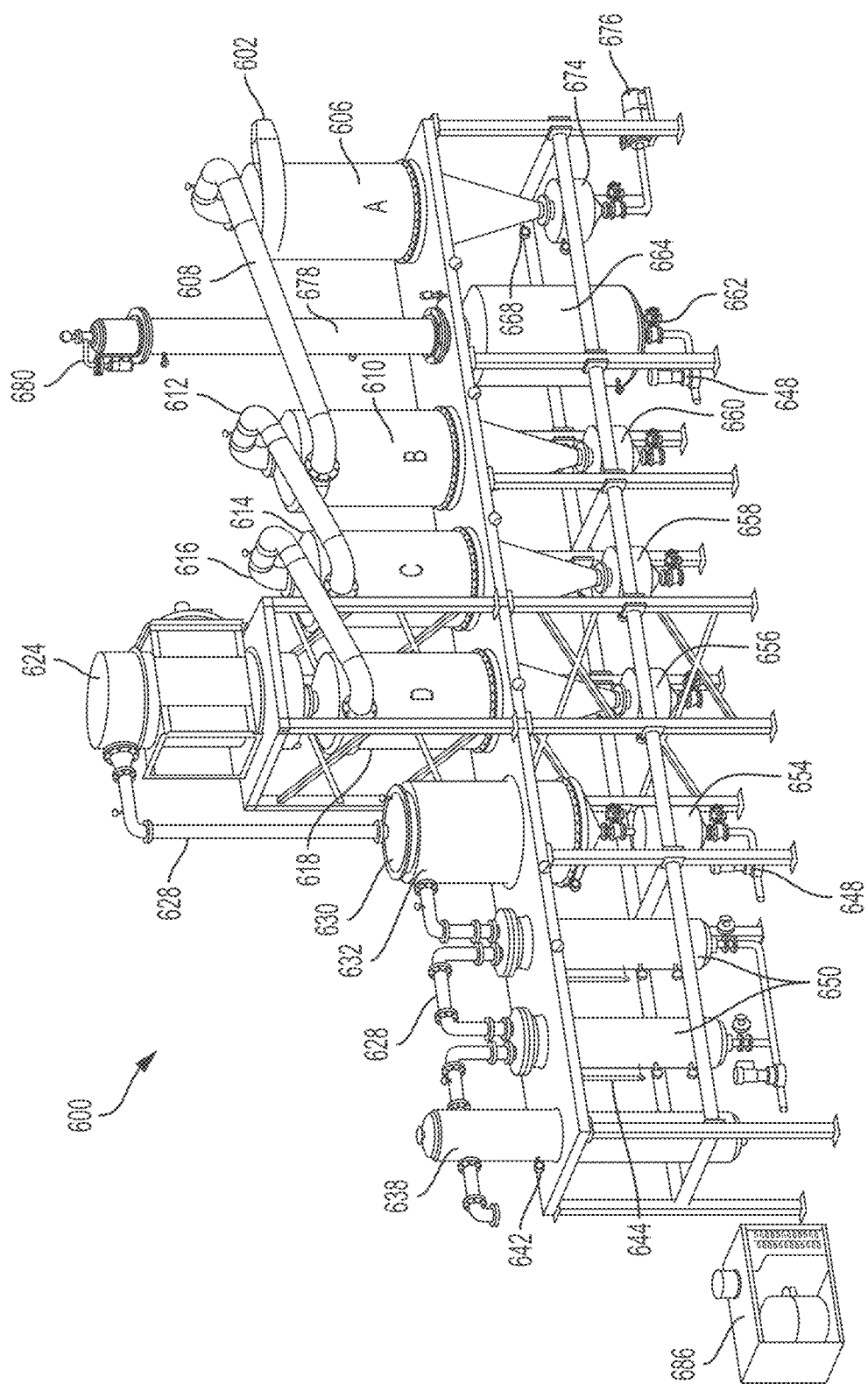
FIG. 6 illustrates a cyclonic condensing and cooling system according to one embodiment of the present invention.

Turning to FIG. 6, the disclosed subject matter is directed to a cooling system consisting of a plurality of cyclone coolers (e.g., one standard cyclone cooler and one or more specialized cyclone coolers) thereby forming the disclosed cyclonic condensing and cooling system 600. According to disclosed embodiments, the standard cyclone cooler may be considered to be a first-type cyclone cooler having a first configuration, as explained herein. The one or more specialized cyclone coolers may be considered to be second-type cyclone coolers. Thus, the one or more second-type coolers may have a substantially identical second configurations with respect to the other one or more second-type cyclone coolers, as explained below. Yet, the first-type cyclone cooler having the first configuration is different from the second-type cyclone coolers having the second configurations, as explained below.

By way of example, one standard cyclone cooler is depicted as A in FIG. 6. In an exemplary embodiment three specialized cyclone coolers are illustrated as B, C and D in FIG. 6. Each of the specialized cyclone coolers B, C and D are of the type illustrated, for example, in FIG. 7. An exemplary embodiment of the standard cyclone cooler may comprise a first configuration. An exemplary embodiment of the specialized cyclone coolers may comprise a second configuration, each of the second configurations being alike one another but different from the first configuration of the standard cyclone cooler. The disclosed cyclonic condensing and cooling system 600 may include a chiller 630, an air heat exchanger 624, two liquid bubblers/scrubbers 650, a main holding or main liquid fuel collection tank 664, and an expansion tank 638.

In an exemplary application, a pyrolysis reactor processes plastic waste material which may be shredded and fed therein. Applying heat above 350 degrees Celsius will cause the shredded plastic material to melt and vaporize. The up-stream reactor requires back pressure to assist in the thermal cracking of the carbon chains present in the plastic material. The cyclonic condensing and cooling system 600 may be employed to produce the required back pressure required by the pyrolysis reactor. Such back pressure is achieved due to the static friction of the pipe and cyclone coolers of the disclosed subject matter in addition to the water column pressure produced in the bubblers/scrubbers 650 (e.g., depicted in FIG. 10).

Turning to FIG. 6, the first cyclone cooler is illustrated at 606. First cyclone cooler is a standard cyclone cooler. A standard cyclone cooler consists of an inlet section, body wall, cone to discharge and an internal tube. When the vapor or gas stream enters the cyclone it rotates around the body and down the cone, then up through the tube and out of the cyclone. The amount of rotation on the incoming gas, dictates the amount of rotation and centripetal force it produces and particles being conveyed with the gas. This force separates the particles from the gas and drops through the cone, then out of the cyclone. The gas rotates and drops down the cone, increasing in velocity and pressure due to the smaller and smaller diameter on the cone. This action packs the gas stream at the bottom of the cone and forces it to rise back up and through the internal tube, then out of the cyclone to the next cyclone. The rotations of the vapor within first cyclone cooler 606 are based on the velocity of the gas as it enters first cyclone cooler 606. In the disclosed subject matter, a cyclone inlet is depicted in FIG. 6 at 602 and FIG. 7 at 602. Inlet 602 has a diameter of about 6 inches wherein its inlet velocity can accommodate a vapor or gas stream of about 3,234 feet per minute based upon the pyrolysis reactor's rate capability based upon the following values: approximately 2,000 pounds of shredded plastic material processed per hour at about 1,150 degrees Fahrenheit. As the pyrolysis reactor has about a 7 percent char rate, the remaining volume of shredded plastic processed (after the char is removed) is about 1,860 pounds per hour processed into a gaseous state. The gas weighs 0.78 ounces per cubic foot. Thus, standard cyclone cooler 606 receives gas at a rate of about 635 cubic feet per minute. The ambient temperature is assumed to be about 70 degrees Fahrenheit for purposes of exposure to heat loss.

The vapor remains in first cyclone cooler 606 for about 4 seconds. This allows for a heat loss of between about 3 and 8 degrees Fahrenheit. The fuel collected at a bottom 151a of first cyclone cooler 606 contains carbon chains that are C-28 or larger. First cyclone cooler 606 also collects large char particles that may have travelled into cyclonic condensing and cooling system 600. These char particles will drop out of the vapor stream and will be deposited to the discharge hopper at the bottom 674 where it mixes with fuel containing carbon chains that are C-28 and larger. This fuel char mixture may be returned and re-fed into the pyrolysis reactor for further thermo cracking via a high temperature pump 676. The vapors leaving standard cyclone cooler 606 are traveling at a velocity of about 3,224 feet per minute and will travel through a cross over pipe 608 for about 2.9 seconds. Due to the thin wall of cross over pipe 608, heat loss of the vapor as the vapor travels through cross over pipe 608 will be approximately 2 degrees Fahrenheit. This heat loss lowers the inlet vapor volume of vapor entering the second cyclone cooler 610.

Figure 7:
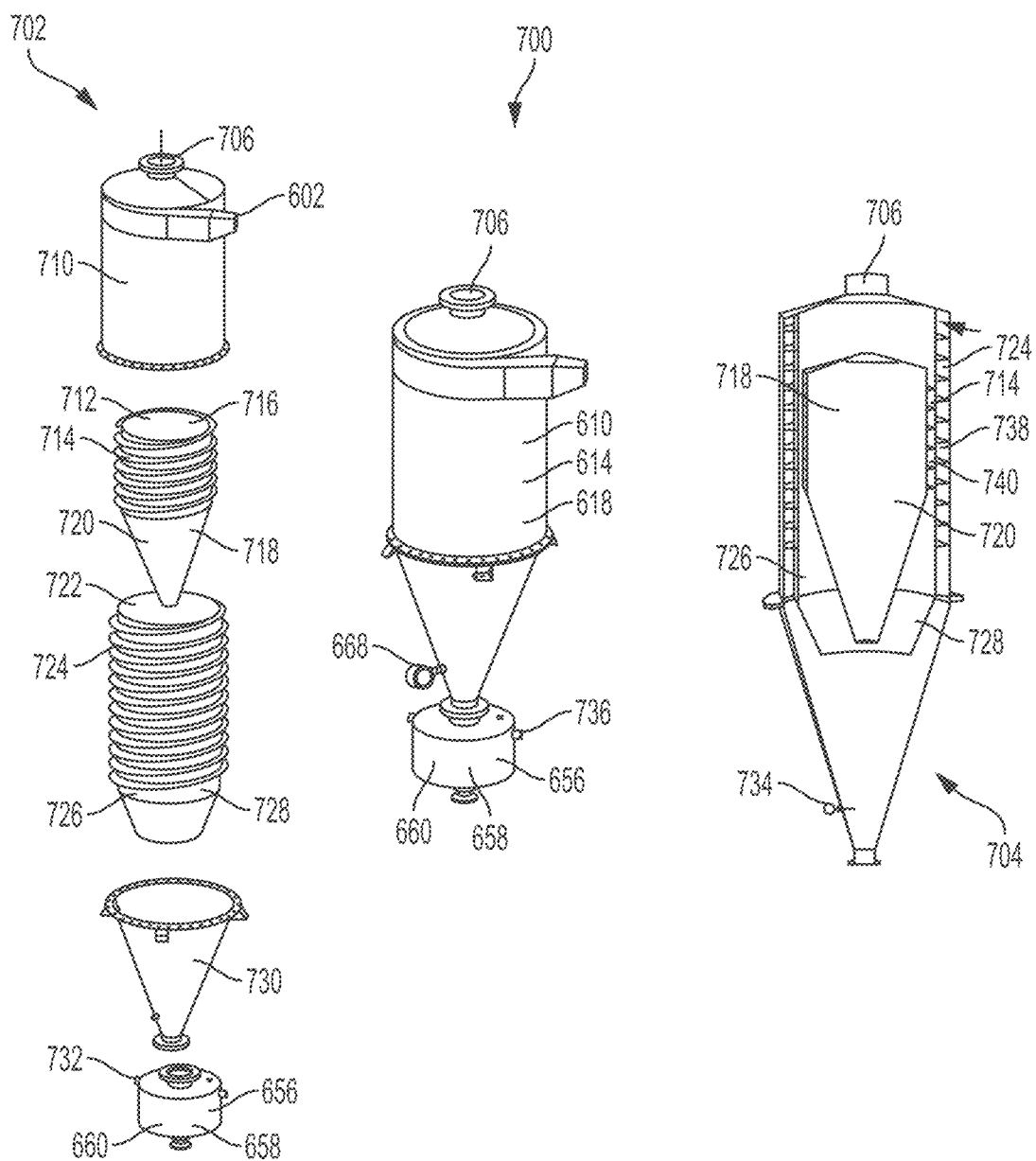
FIG. 7 illustrates an assembled, an exploded and an internal view of cyclones B, C, and D of FIG. 6 according to one embodiment of the present invention.

Turning to FIG. 7, a cross section of specialized cyclone coolers 610, 614, and 618 (second cyclone cooler, third cyclone cooler and fourth cyclone cooler, respectively) of FIG. 6 illustrates the internal structure of specialized cyclone coolers (610, 614, and 618) that forces gas vapors to follow a cyclonic path to maximize vapor contact with outer the outer body of the cyclone cooler (that is contiguous to ambient temperature) in order to dissipate heat and to effect condensation.

Accordingly, second cyclone cooler 610 (FIGS. 6 and 7) is a specialized cyclone cooler constructed with a unique configuration different from the standard/first cyclone cooler 606. As illustrated in FIG. 7, second cyclone cooler assembly 610 is illustrated in an assembled view 700, and exploded view 702 and an internal view 704. Second cyclone cooler may include a body portion 710 joined to a cone 150 in a final assembled state. Contrary to the standard cyclone cooler, the second cyclone cooler has additional internal components in a disclosed arrangement of the disclosed subject matter. Specifically, in connection, body portion 710 and cone 150 house an internal structure or internal tube comprising an outer tube structure 726 and inner tube structure 718. Inner tube structure may be regarded as an inner filler drum 720. Outer tube structure 726 has a cavity 722. In a final assembly, inner tube structure 718 is disposed within a cavity 722 of outer tube structure 726. Inner tube structure 718 comprises a cavity 216 for accommodating disbursed gases therethrough.

The body 728 of outer tube structure 726 includes a first set of turning fins 724 disposed along its exterior in a first rotational direction, as described below. A configuration of turning fins 724 may include an internal cyclonic rotation fin configuration. Inner tube structure 718 includes a second set of turning fins 714 disposed along its exterior traversing in a second rotational direction. A configuration of turning fins 714 may include an internal cyclonic rotation fin configuration. In one embodiment, the second rotational direction may include a reverse or opposite cyclonic rotational fin direction to turning fins 724, as further described below.

Thus, in a final assembly, inner tube structure is disposed in cavity 722 of outer tube structure 726 to form an internal tube assembly. The internal tube assembly is further disposed within the cavity of the joined body portion 710 and cone 150. In the final assembly configuration, a first channel 738 is formed between an exterior of the outer tube structure 726 and the interior of the body portion 710. Additionally, a second channel is formed between an exterior of the inner tube structure 718 and an interior of the outer tube structure 726 within cavity 722. Turning fins 724 are disposed within first channel 738 in a first direction and turning fins 714 are disposed within second channel 740 in the second direction, as discussed below.

In select embodiments, the disclosed subject matter provides second cyclone cooler 610 designed with about 158 feet of turning fins 724. The distance between turning fins 724 is about 4 inches (the pitch) with the width of the flight being about 3 inches. Turning fins 724 may be designed having 12 spiral rotations with a 36 inch outside radius. Fins 714 placed on inner tube structure 718 may include 6 spiral rotations with the same pitch and width as turning fins 724.

Figure 12:
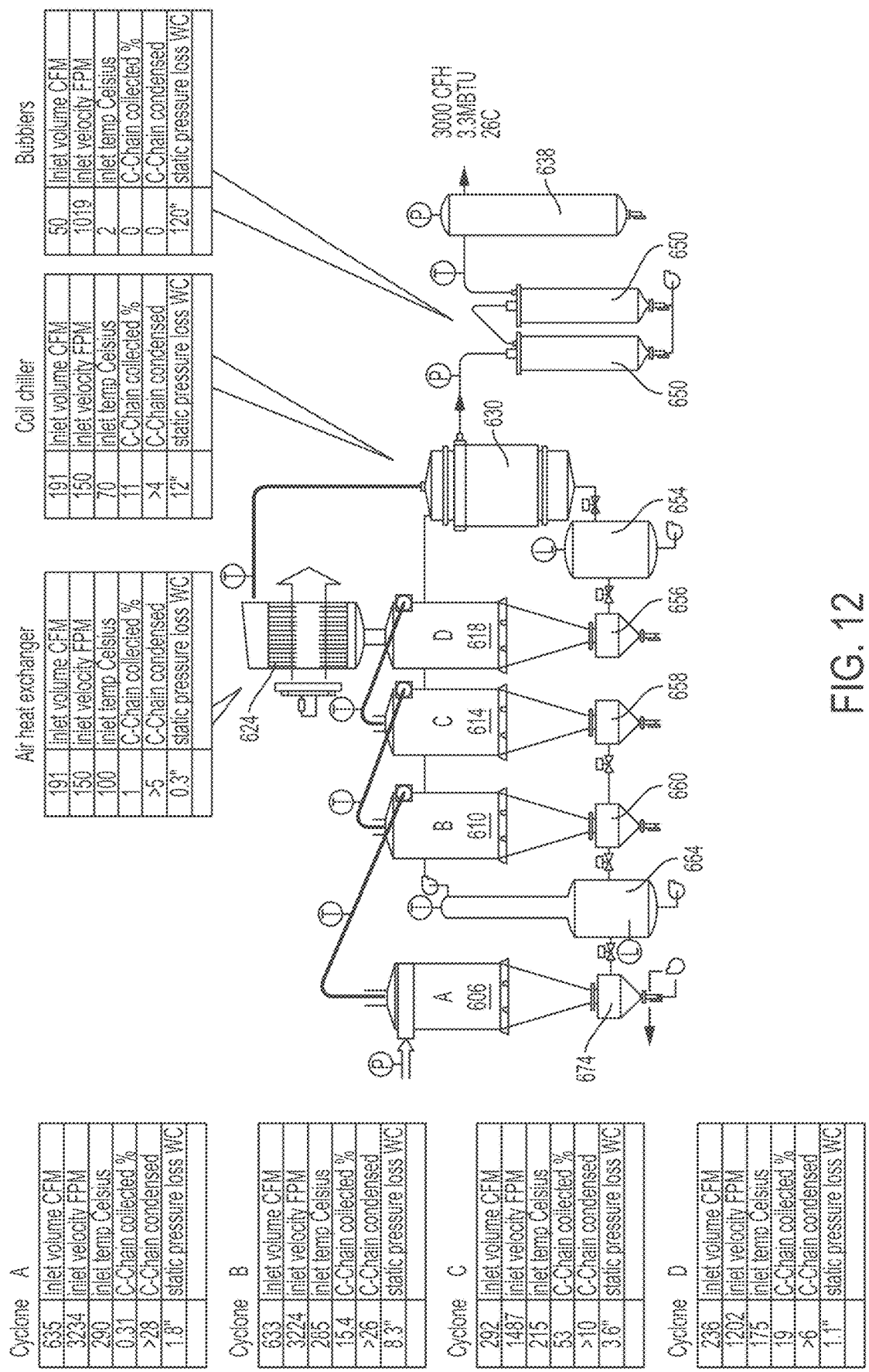
FIG. 12 is a schematic of the process flow of the condensing/cooling process according to one embodiment of the present invention.

Turning fins 724 are attached inside the body 710 of second cyclone cooler 610 to force the amount of rotations of received gases. This makes the gases come into contact with body 710 a fixed amount of times before entering a cone 150 disposed below. The travel time through second cyclone cooler 610 is about 3.8 seconds based on the process rate of the reactor of about 2000 pounds of shredded plastic per hour. There is heat loss in second cyclone cooler 610 due to the friction produced by fins 724 as the fins act as heat sinks. As vapors cool, they condense and lose volume; loss of volume reduces the velocity of gas reducing its velocity and creating more retaining time. This assists in further heat loss within the cyclone coolers. (FIG. 12 provides a schematic of the remaining cyclonic cooling system calculated losses for the disclosed subject matter.)

Third cyclone cooler 614 (FIGS. 6 and 7) is identical to second cyclone cooler 610. Likewise, third cyclone cooler 614 is a specialized cyclone cooler being constructed with a unique configuration different from the standard/first cyclone cooler 606. The process involved in third cyclone cooler 614 is identical to second cyclone cooler 610; third cyclone cooler 614 being designed and constructed in the same manner as second cyclone cooler 610. In operation, vapors leave second cyclone cooler 610 and travel to third cyclone cooler 614 via cross over pipe 612. The cooling process continues reducing the volume of the vapor and reducing the velocity of the vapor.

Figure 9:
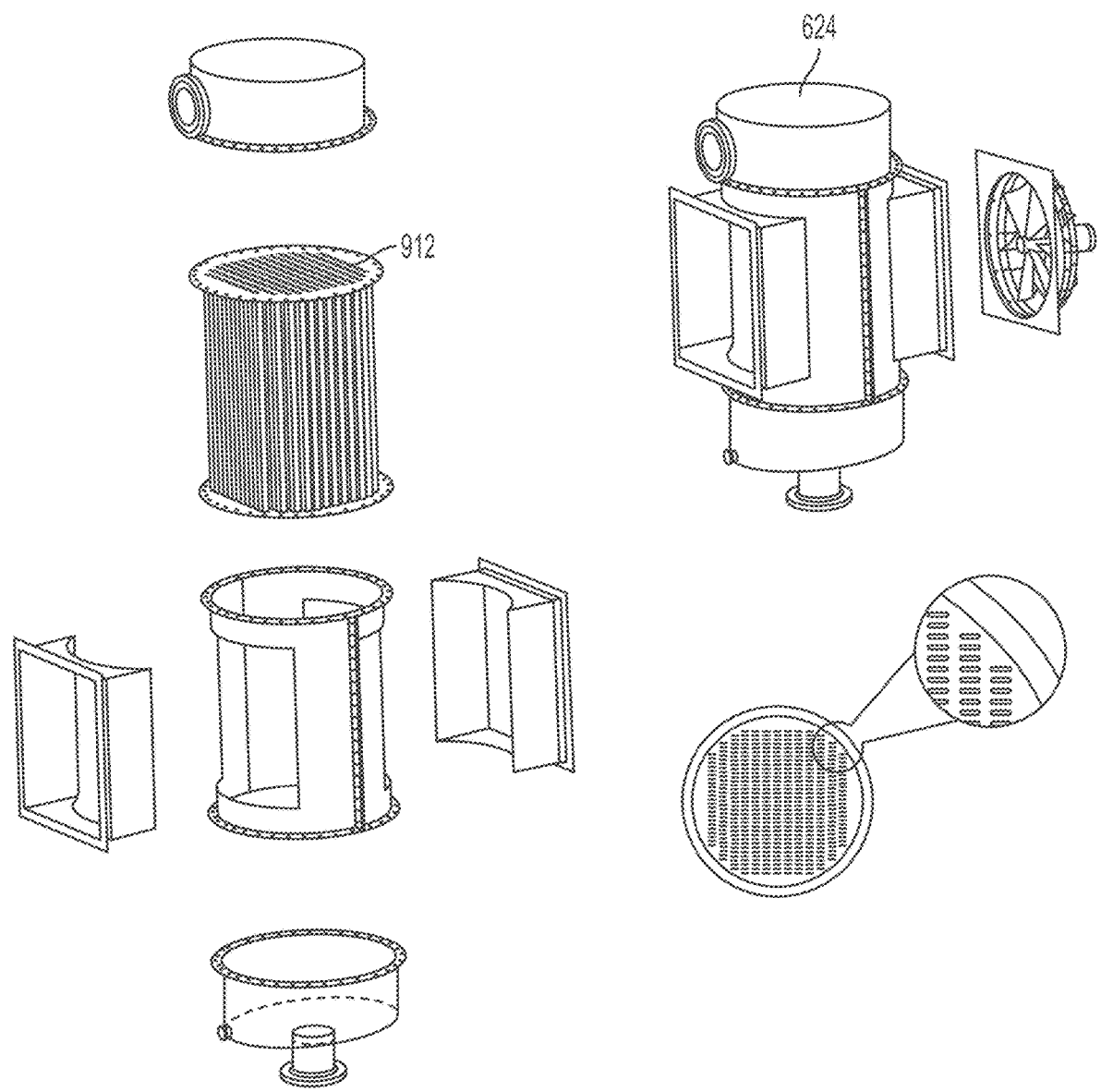
FIG. 9 illustrates an assembled and exploded view of a forced air cooling/condensing system according to one embodiment of the present invention.

Fourth cyclone cooler 618 (FIGS. 6 and 7) is identical to second cyclone cooler 610 and third cyclone cooler 614. Likewise, fourth cyclone cooler 618 is a specialized cyclone cooler being constructed with a unique configuration different from the standard/first cyclone cooler 606. Fourth cyclone cooler 618 is designed and constructed in the same manner as second cyclone cooler 610 and third cyclone cooler 102c. In operation, vapors leave third cyclone cooler 614 and travel to fourth cyclone cooler 618 via cross over pipe 616. The cooling process continues reducing the volume of the vapor and reducing the velocity of the vapor. A design configuration of fourth cyclone cooler 618 may allow vapor to leave this cyclone and enter into a forced air heat exchanger 624 (see, FIGS. 6 and 9). In an exemplary design, forced air heat exchanger (air cooled condenser) 624 has a total cross sectional area of about 1600 square inches inside the oval flatten tubes. This high surface area increases the reaction time and slows the velocity of the remaining gas stream to about 150 feet per minute and reduces the heat dramatically from approximately 100 degrees Celsius to 70 degrees Celsius due to the ambient air temperature. This creates a large amount of condensation that is collected inside oval flatten tubes 912 and allowed to drip back into fourth cyclone cooler 618 disposed located directly below. This returning liquid fuel, in turn, further cools the vapor leaving third cyclone cooler 614. The vapor travels through forced air heat exchanger 624 and is pushed into chilled cooling coils of coil condenser 630 (FIGS. 1 and 3) via pipe 628.

Figure 8:
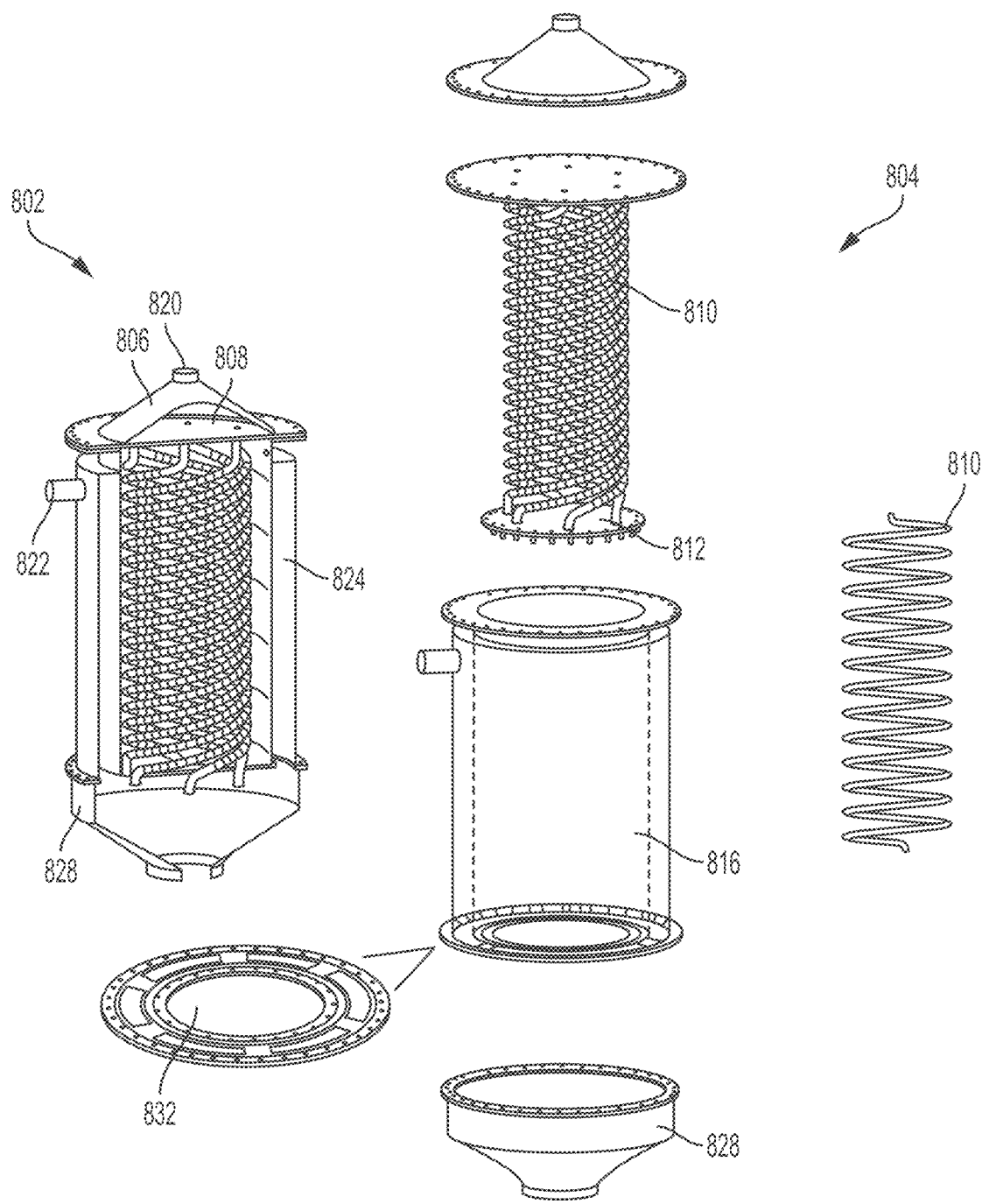
FIG. 8 illustrates an assembled view, an exploded view and an internal view of a coil condenser according to one embodiment of the present invention.

Turning to FIG. 8, an internal configuration 802 and exploded view 804 of coil condenser 630 is illustrated. Coil condenser 630 serves as a short carbon chain condensing unit. In an exemplary embodiment, coil condenser 630 is a cooler that is constructed with six internally coiled 1 inch tubes 810 that are submerged through a tank 816 of chilled glycol. The six 1 inch diameter stainless steel round tubes are in the form of a spiral. The spiral reduces the overall length of the 1 inch tubing from sixty feet where it is contained in an apparatus that is about five feet in height. The six coils are generally arranged evenly around each other in a circular pattern. This creates an even distribution of the flowing gases inside the coils. The spiral shape assists in the slowing of the incoming vapors by the use of turning static pressure. These coils are attached through a top and bottom flange plate 832. This assembly is inserted into a drum housing 816 with matching flanges 812 and 816. The drum housing 816 is filled with a glycol product that acts as the media for the heat exchange. The glycol remains present inside this drum. A cooling coil 810 is introduced into the drum which cools the glycol. In turn the glycol cools the 1 inch tubing that is carrying the vapors inside.

Cooling coil 810 is attached to a standard refrigeration system 686 (FIG. 6) and remains closed loop through the glycol drum 816. The vapors pass through cooling coil 810, allowing condensation to drip into the collection chamber 828. The vapor that does not turn into condensation exits the coil condenser at 632 after the vapor circles the glycol drum. The flange connection 832 at the bottom of the glycol drum allows the liquid to go in one direction and gas to go in another. The chamber 824 between the glycol drum and the housing is the location of where the vapors travel to the gas outlet at 632. This zone also sees the glycol temperature on the outside of the glycol drum 816 to further cool the vapor. The condensed vapor that exits coil condenser 630 as a liquid is collected in a smaller or secondary tank 654 (FIG. 6) and pumped to storage.

Coil condenser 630 is designed with bolted flange connections 808 for access and service to all components of this equipment. Each cyclone cooler and the coil chiller has a tank or collection hopper below them (FIGS. 6 at 674, 660, 658, and 656). In the case of the cyclone coolers, the collection discharge hopper (FIG. 6 at 674, 151b, 151c, and 151d) has a drain port, level indicator (FIG. 6 at 668) coupling connection and a fuel outlet port (spill over) (FIG. 7 at 732). The spillover 732 allows for the build-up of collected fuel to be discharged into a respected holding tank.

Figure 11:
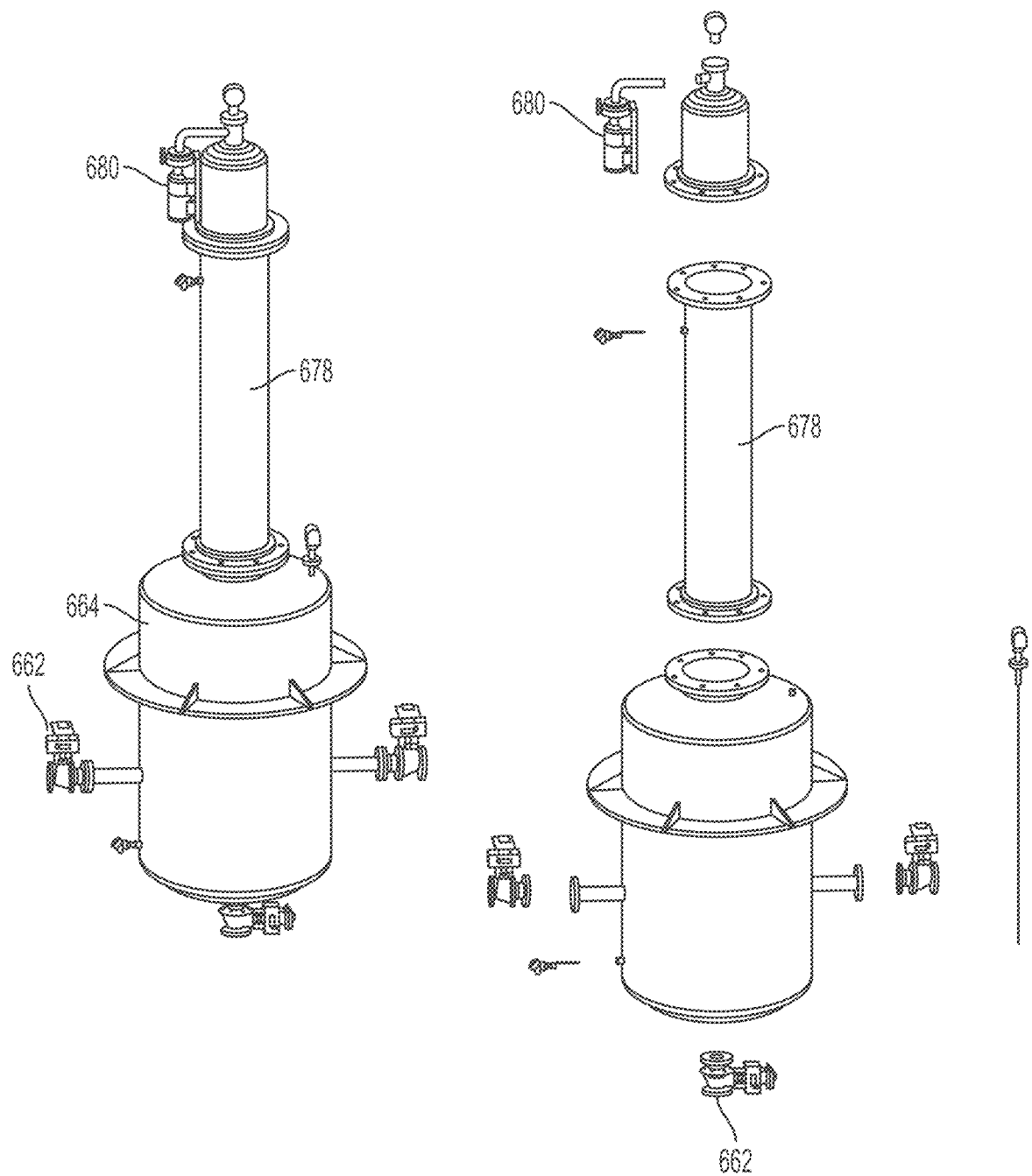
FIG. 11 illustrates an assembled and exploded view of a main liquid fuel collection tank and a flash tank for removal of hydro-carbon gases according to one embodiment of the present invention.

The first three cyclones coolers 606, 610, and 614 discharge into a first hold tank also regarded as the main holding tank 664 via control ball valves 662 (FIGS. 6 and 11). The fourth cyclone 618 discharges in smaller or second holding tank also regarded as secondary tank 654 that is located beneath the chilling coil of coil condenser 630. According to the disclosed subject matter, smaller or secondary tank 654 receives the lighter, cooler collected fuels. The lighter or cooler collected fuels may include lighter or shorter carbon chains (i.e., gasoline, naptha) as opposed to diesel which has longer carbon chains. Main holding tank 664 collects heavier heated fuels (i.e., those fuels having a higher boiler point). Disclosed embodiments provide that main holding tank 664 collects the heavier heated fuels as being filled from the cyclone coolers 606, 610, and 614. Higher temperature fuels are regarded as those fuels having higher boiling points and higher flash point e.g., above 40 degrees Celsius. Although the first three cyclone coolers 606, 610, and 614 collect higher temperature fuels, some amount of light fuel (like benzene) may also be collected. The lighter fuels will vaporize from the heat of the holding fuels inside main holding tank 664 and drift up the tank column 678. A pump 680 located at the top of the expansion column 678 will pull these vapors from main holding tank 664 before they can re-condense and force them into coil condenser 630. This allows for the collection of fuel of higher quality in main holding tank 664 by rising the flash point on the collected fuel. Disclosed cyclones coolers A, B, C, D all work together to collect fuels having a range of carbon to carbon chain structure. In accordance with disclosed embodiments, the configuration of cyclonic condensing and cooling system 600 allows heavier heated fuels to be collected by cyclone coolers A, B, C, and D while the lighter fuel is capable of being collected in coil condenser 630.

The chilled gases leave coil condenser 630 and travel to two bubbler tanks 650 that are connected in sequence through pipe connection 141. These tanks have an extended pipe from the inlet port that is submerged under the liquid water line FIG. 10 at 1014. This submerged pipe 1014 causes back pressure to the system by the resistance of the liquid in the bubbler tank. This is referred to as water column pressure. By using two tanks to achieve the water column pressure, the height can be divided. These bubbler tanks can contain different liquid components as needed to remove any contaminants in the remaining vapors. As illustrated in FIG. 10, the first tank is designed to hold water and is equipped with a level indicator 1022 and a PH meter 1024 to monitor the condition of the water. Water is used to remove sulfur and the buildup of sulfur will indicate a change in the PH. The second bubbler contains caustic soda. This will capture any chlorine gas in the vapors. This tank also has a PH meter 1024 and is also equipped with a level indicator 1022 and level sensor.

The last tank on cyclonic condensing and cooling system 600 is a standard expansion tank 638. Expansion tank 638 is also designed to catch any liquid droplets that may travel through cyclonic condensing and cooling system 600. Pressure sensors and indicators monitor the reactor pressure from this point in the system.

In operation, the as gases are received within the disclosed cyclonic condensing and cooling system 600, embodiments of the disclosed subject matter force rotations of the gases through the system. Throughout rotation, the hot gases will lose heat from thermo contact loss with the outside body wall 710. In accordance with the design of the disclosed subject matter, the incoming gasses are channeled down first channel 738 in a direction commensurate with a first rotational direction enabled by turning fins 724 and up second channel 740 commensurate with a second rotational direction mandated by the placement of turning fins 714. In an exemplary embodiment, the second rotational direction may include a reverse rotational direction from the first rotational direction. Prior to traversing up second channel 740, embodiments of the disclosed subject matter allow the gases to pack generally at the bottom of cone 730 like a standard cyclone whereupon they are forced to reverse rotational direction before entering the internal tube (i.e., outer tube structure 726 and inner tube structure 718). This adds to the particle separation, because the gases come to a complete stop before reversing direction, allowing the particles to fall out of the gas stream. The design then uses the cyclone as a separator and a cooler/condenser. As hot gases lose heat, condensation is collected in the cooler area. By controlling the gas resident time inside the cyclone, a fixed condensing temperature can be achieved. By controlling this temperature, fuel can be distilled into c-chain groups between a group of cyclones.

Embodiments of the disclosed cyclonic condensing and cooling system provide four cyclone coolers in series (FIG. 6 at 606, 610, 614, and 618). The first cyclone cooler 606 collects the larger particles and higher carbon chain fuels only. The next three cyclone coolers 610, 614, and 618 separate the fuel grades (e.g., gasoline, petroleum, derived liquid for fuel) based on condensing temperatures. Separated fuels have temperatures which cause vaporization of the fuels to ignite when exposed to an open flame. This process is referred to as a flash point. The lower the carbon chain number in the fuel, the lower the temperature of the liquid fuel, that will cause the fuel to ignite. This temperature will be referred to as the "yield flash indicator" (YFI). In order to increase the YFI, the removal of the lighter carbon chains by use of heat is required.

Each cyclone collects vapor at a lower temperature than the one before it in the gas stream creating its own YFI value. Inside the internal tube FIG. 7 at 728 is a reversed set of fins 714 connected to a filler drum 720 inside the tube. The discharge of each cyclone cooler has a hopper, or discharge tank 151 to store condensed fuels. Each hopper can be directed to a holding tank by selected ball valves. A level indicator 668 is used to start the discharge of the collected fuels. The collection hopper also has a drain valve (FIG. 6 at 662) for cleanout use.

The last cyclone cooler, the fourth, in the series (FIG. 6 at 618) will have an air contact heat exchanger 624 to insure full ambient cooling. This heat exchanger 624 condenses the last of the ambient temperature fuels and drips it back through the cyclone, acting as a reflux and cooling for the cyclone. The remaining vapors then pass through a coil type chiller 630 via a connecting pipe 628. This is a set of five coils (FIG. 8 at 810), e.g., averaging 65 feet in straight length each and wrapped around each other in an even spacing. The coils 810 are set inside a tube filled with glycol 816 for chilling. This glycol is chilled with refrigerated coils 826 from an air conditioner compressor and controlled to maintain the set point temperature. The incoming vapors entering the coil condenser 630 at entrance 820, for example, disposed at top portion 806, will condense and drip out of the chiller housing 828. The vapors then turn up from the bottom of the coils and travel to the gas outlet 822. On the way to this outlet port, the gases are again exposed to the cold wall (FIG. 8 at 824) of the glycol chamber (FIG. 8 at 816). This creates an effectiveness of 100% use of the chilling chamber. The remaining gases are considered non-condensable at room temperature. This gas is referred to as syn-gas.

The syn-gas is then passed through two sets or bubbler/scrubbers 650. The first is filled to a fixed point with water. This water acts as a back pressure device, a flame arrester device and a scrubber. Along with the C4, hydrogen and other gases that make up the syn-gas, some unwanted gases also travel with the syn-gas from time to time. Without good control of the plastics entering in the reactor, chorine and sulfur can be introduced. The first bubbler will catch the sulfur in the water producing a weak dibasic acid, $SO_2 + H_2O = H_2SO_3$.

The next bubbler also acts as a back pressure device, flame arrester and scrubber. This time it is filled with caustic soda to scrub chorine. $Cl + NaOH = NaClO$ or salt and water. The bubblers 650 are also equipped with a level control 1022 so the level of the bubbling liquids is monitored as well as a PH meter 650 at 1024 to indicate the condensing on the bubbling/scrubbing liquids.

At this point the syn-gas is ready to be used. Thus, embodiments of the disclosed subject matter provide an improved means for capturing and processing excess gas for use on any device capable of running on gaseous fuel, i.e., non-condensable petroleum fuels. Accordingly, the burners for reactor-type systems are capable of utilizing the fuel of the disclosed subject matter. The syn-gas may also be used to power a generator that could power the electrical system of the reactor. The last item in the cooling system is a finish tank. This tanks act a drip collection if any liquids travel past the bubblers. It also serves as an expansion tank for the syn-gas. When the pressure inside this tank is at set point, the gas is allowed to be used.

Turning to an example design construction of cyclonic condensing and cooling system 600, disclosed embodiments may consist of four cyclones, two fuel tanks, an air cooled radiator, one glycol chilled coil condenser, two bubblers, and one expansion tank all attached to a structural steel frame. The cyclone coolers may be constructed from 10 gauge stainless steel material. This material is selected due to its ability to withstand the internal pressure of the reactor while allowing heat to pass through the metal, cooling the incoming gas. The cyclone coolers consist of a scrolled inlet, flanged body section, internal tube with fixed rotation fins, an interior baffle with reversed rotation fins, a bolted cone with support pads, and a discharge hopper with an outlet port.

The internal rotation fins are welded to one side of the cyclone tube allowing for the condensed liquid to run through the fins to the discharge hopper. The internal tube also has a cone bottom to continue the vapor to pressurize inside the cyclone. Inside the internal tube is a cone drum that acts as a baffle. This baffle also has rotation fins welded to one side. The cone drum baffle has a sloped top to allow for drainage of any condensation that may occur inside. The gas inlet and outlet discharge ports have a flange connection. The cone bottom is equipped with a coupling that acts as a level indicator. The cone bottom has a discharge part with a stub in flange for rotation and connection to the discharge hopper. The discharge hopper has a drain port, two outlet ports and the level indicator coupling.

The cyclone coolers (A, B, C, and D) are piped in a daisy chain configuration. The piping used between cyclone coolers is a thin wall schedule 10 stainless steel pipe with ANSI 150 flanges. This pipe is sloped from one cyclone coolers to the next and downhill to drain any condensation vapors. The last cyclone cooler in the daisy chain configuration has an air cooled heat exchanger connected to the top discharge flange. This air cooled heat exchanger reduces the remaining vapor temperature and allows for liquid to condense and return to the last cyclone where it enters the discharge hopper. This air cooled heat exchanger is constructed from oval-shaped tubing. The oval-shaped tubing is welded to the top and bottom seal plate, openings in the seal plate are welded to the oval-shaped tubing to allow vapors to pass through the inside of the tubing. Housing surrounds the tubing section and connects to an inlet chamber and gas discharge chamber. The fan is connected to the tube section housing. This part of the system uses ambient air and forces it across the outside of the tubing to reduce the inside vapor temperature.

The fuel tanks may be constructed from heavy wall schedule 40 stainless steel pipe with pipe ends and connecting ports as needed to fill and discharge the incoming fuels. The top of the main tank 664 has an expansion column to allow light vapors to be removed from the collected liquids below. The second tank 654 is a standard holding tank with inlet and outlet connections plus a coupling for level indication. The large tank 664 is constructed to allow for high temperature fuel storage and collects from the first three cyclones. The smaller tank 654 will see low temperature fuels and is used to collect fuel from the last cyclone and the coil condenser.

After the vapors leave the air cooled heat exchanger 624 it enters into a chilled coil condenser 630. The coil condenser is located above the small fuel tank 654. The condenser consists of six 1 inch diameter stainless steel round tubes that have been rolled into a spiral. The spiral reduces the overall length of the 1 inch tubing to one tenth the length. The spiral shape also assists in the slowing of the incoming vapors by use of the turning static pressure. The coils are attached through a top and bottom flange plate. This assembly is inserted into a drum housing with matching flanges. The drum housing is filled with a glycol product that acts as the media for the heat exchange. The glycol remains resident inside this drum. A cooling coil is introduced into the drum which cools the glycol. In turn the glycol cools the 1 inch tubing that cools the vapors inside. The cooling coil is attached to a standard refrigeration system and remains closed loop through the glycol drum. The vapors passing through the 1 inch coils, cool, so the coil condenser allows the produced condensation to drip to the bottom in the collection chamber, exiting the device. The special flange connection at the bottom of the glycol drum allows for liquid to go in one direction and gas to go in another. The chamber between the glycol drum and the outside is where the remaining vapors travel. This zone also is cooled by the glycol thus it benefits from double cooling. The coil condenser is designed with bolted flange connections for access and service to all components of this equipment.

The chilled gases leave the coil condenser then travel through two bubbler tanks 650. These tanks have an extended pipe from the inlet port that is submerged under the liquid water line. This submerged pipe causes back pressure to the system by resistance of the liquid in the bubbler tank. This is referred to as water column pressure and by using two tanks the height can be divided between each one. An example is if total water column back pressure is 60 inches in one bubbler and 50 inches in the second bubbler, a total of 110 inches of water column back pressure is created. These bubbler tanks can contain different liquid components as needed to remove any contaminants in the remaining vapors. The first tank is designed to hold water and is equipped with a level indicator and a PH meter to monitor the condition of the water. Water is used to remove sulfur and the buildup of sulfur will be indicated by a change in the PH. The second bubbler contains caustic soda which will capture any chlorine gas in the vapors. This is also monitored with a PH meter and this second bubbler is also equipped with a level indicator and level sensor.

The last tank on the cyclone cooling system is a standard expansion tank 638 that is designed to catch any liquid droplets that may travel through the piping. Pressure sensors and indicators mounted on this expansion tank keep track of the reactor pressure. Throughout the cyclonic condensing and cooling system 600 are differential pressure gauges. These gauges are used to identify any buildup or clog edge in the pipe or in any component of cyclonic condensing and cooling system 600. The entire process is mounted on a bolted steel frame system. The frame system may utilize a standard A36 carbon steel frame, painted and equipped with matching connection clips for all corresponding equipment. The size and shape of the equipment is designed for quick breakdown and transport in a standard sea container.

Accordingly, the disclosed cyclonic condensing and cooling system 600 improves on heat exchanged technology as it does not require the bolting of the heat exchangers from end to end; takes up much less space than if the current technology was used; increases the surface area inside of the condensers that make up a heat exchanger; requires much lower velocity of the vapor when entering the condenser; allows for the continued release of the condensed liquid after the heat exchange and reaction, allowing the non-condensed vapors to move to the next condenser, and; prevents the build-up of char that could plug the tubes within the condensers.

Heated Airlock Feeder Unit

Disclosed embodiments improve on extruder technology as it allows for the continuous feeding of the reactor while using much less power, thus increasing efficiency and lowering the cost of production for the fuel product. This application relates to an apparatus that is part of a reuseable fuel processing unit and allows for the continuous feeding of plastic into the unit since the apparatus described herein creates a process by which heat is tolerated in an anaerobic environment, atmospheric pressure does not leak in and out of the apparatus, air does not leak into the apparatus, and plastic in solid and heated liquid form does not cause problems within the apparatus downstream from the feeder.

Accordingly, plastic waste material is shredded and fed into a pyrolysis reactor. Applied heat above 350 degrees Celsius causes the shredded plastic material to melt and vaporize. The heated airlock system is the apparatus in which the shredded plastic material is fed into the pyrolysis reactor. The main components of the heated airlock feeder system are the drive, coupling, gearbox, augers, housing, burner boxes, expansion cart, and support frame. It has been discovered that the prior art does not allow for the continuous feeding of heated plastic into the feeder while maintaining an air lock. Preferred examples of the disclosed invention include:

Existing gear boxes, designed as short as possible to reduce material and labor on fabrication, have limited function with this utility patent application, as the short gear boxes are limited on taking a cantilever load as the force of trying to hold a long heave shaft puts extreme pressure on the leading bearing resulting is reduction of the life of the bearing or requiring a heavy duty bearing to handle the force. If a heavy duty bearing is used, this results in a larger bearing creating large pockets in the gear box housing. The larger pocket reduces the ability of the housing to support the bearing, so in turn the housing will be made thicker. This increases the cost of a standard gear box. This design extends the space between the bearings and reduces load on the bearings. By spacing the bearings further apart, the cantilever load is reduced, the bearing size can be smaller and the housing can be thinner, reducing the overall cost and improving the performance. The further apart the points on connection on the bearings, the straighter the alignment on the shafts, reducing wear and increasing the life of the gear box;

A flat bar attached between the cart and the frame that allows for the apparatus to expand and contract due to heat transfer as this apparatus incorporates thinner material in the reactor allowing for better heat transfer;

Two heater zones, allowing plastic material to be transformed from a solid and shredded state to a liquid state; the solid and shredded plastic material at the start of the feeder and the liquid state at the end of the feeder. Between the shredded solid state and the liquid state exists plastic material in a molten state. The molten plastic material is thick and sticky and allows for the formation of the required pressure to create the airlock necessary to keep air from entering the reactor; and, The use of vapor gas (natural gas or syn-gas) and clamshell burners allowing for the external heat to be allowed in the processing of the plastic material whereas prior art used electric heater bands and internal pressure, resulting in high power consumption, to produce the heat required to process the plastic material. The use of vapor gas and clamshell burners allows for less power consumption, faster processing time, and more accurate and consistent heat production.

The use of clamshell burners allows heat to be generated over the entire exterior surface of the penetrating pipe and allowing for access to the reactor tube. The use of the clamshell burners allows for a low profile to the interior reactor reducing the amount of space between the heat source and the penetrating pipe surface, increasing the heat transfer without increasing the BTU value required by a burner system. The clamshell design combines both convection heat and radiant heat producing an even heat source around the penetrating pipe. The combining of the two types of heat is accomplished with the use of a perforated screen running the entire length of the penetrating tube and one third of the way up on the bottom inside of the clamshell burners. This design also prevents hotspots that normally occur in burner boxes. Another difference in this system compared to existing systems is that the igniting source is inside the clamshell burner box next to the perforated screen. The system contains flame sensors as well as a fan pressure switch to ensure airflow. Dual gas streams are used by adjusting the gas quantity or the air quantity, whereas existing systems use complicated air control dampers to adjust the air and gas ratio, that may cause uneven burning of the fuel creating irregular flame size. The clamshell design that is part of the heated airlock feeder is not lined with refractory on all surfaces, but only on the top half of the clamshell. The fact that the lower half of the clamshell is not lined with refractory allows any heat build-up to dissipate through the entire box surface. This design also reduces the chance of auto-ignition of the mixed gas.

Figure 16:
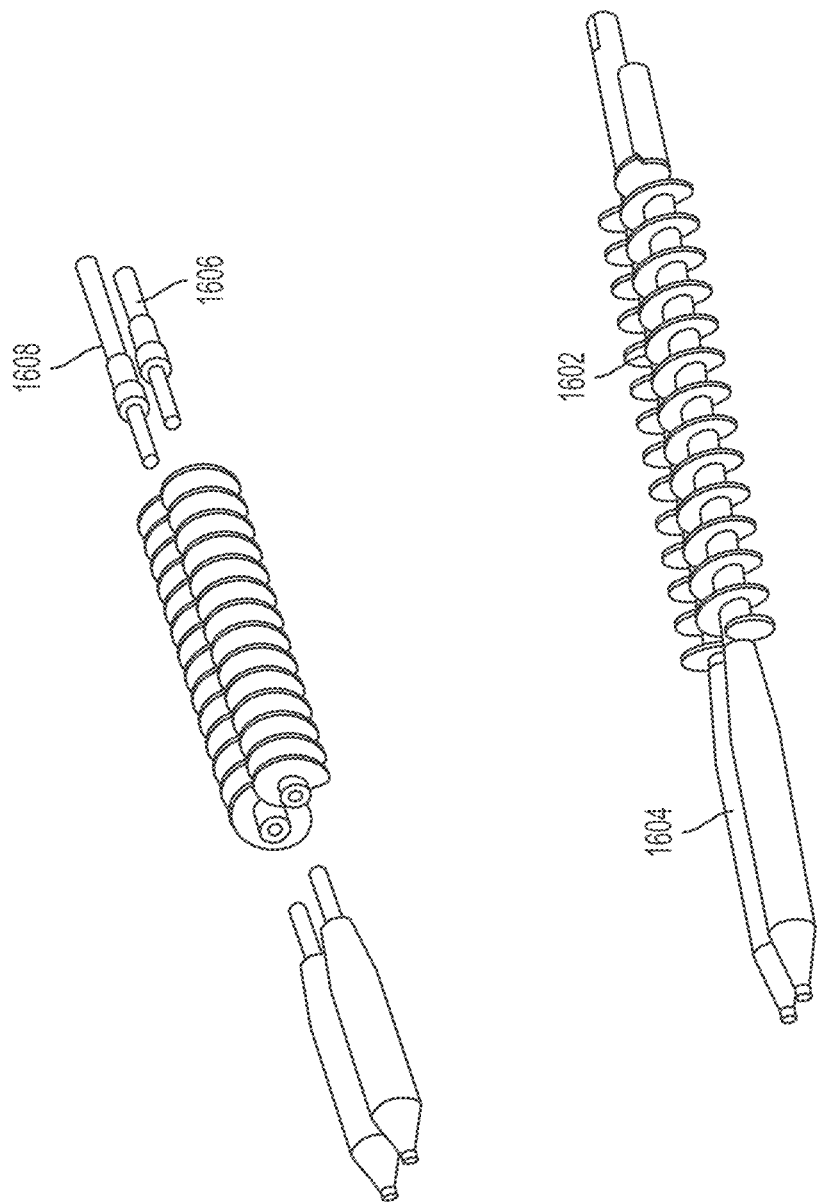
FIG. 16 illustrates exemplary augers utilized within a heated airlock feeder according to one embodiment of the present invention.
Figure 17:
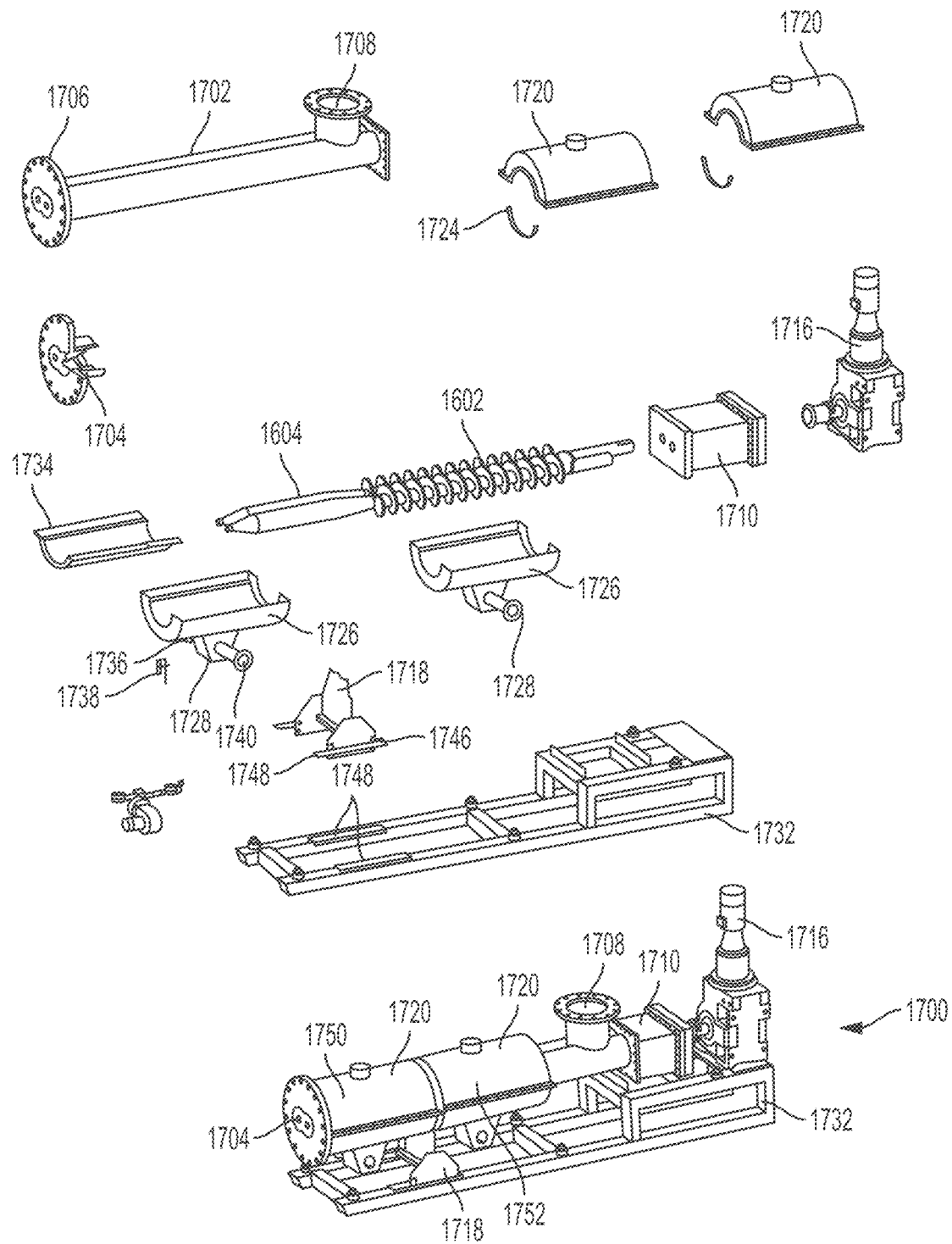
FIG. 17 illustrates an exploded view and an assembled view of an exemplary heated airlock feeder according to one embodiment of the present invention.

The disclosed embodiment allows the application of back pressure to the feed material between the cold material and the heated, melting material (molten plastic). The main components of the heated airlock feeder system are the drive, coupling, gearbox, augers, housing, clamshell burner boxes, expansion cart, and support frame. FIG. 1 depicts the entire assembly of the re-usable energy reactor system. FIG. 17 depicts the heated airlock feeder that is part of the entire assembly of the re-useable energy reactor system. The drive system is a helical gear drive with a high torque ratio FIG. 17 at 1716. The gear drive is selected with the vertical footprint to reduce the system's overall length FIG. 17 at 1716. This drive is connected to a standard sheer coupling. This coupling is design to separate under overloading conditions to protect the gearbox. The coupling consists of two augers. The two augers FIG. 17 at 1602 are custom constructed. These augers are also depicted in FIG. 16. These augers are a machined three-part system. The first part of the augers are the drive shafts depicted in FIG. 16 at 1606 and 1608, one drive shaft being longer than the second drive shaft. These are elongated axially rotatable. The middle section of the augers are elongated, axially rotatable screws each having an elongated shaft with outwardly extending helical flighting along the one-half of the length of each shaft starting at the gear box FIG. 16 at 1602 and connecting to a axially rotating smooth surface auger where the smooth part of each auger at the output side of the apparatus are machined so that the space between each auger and the elongated tubular barrel housing 1702 is less than 1 inch.

These augers are located inside FIG. 17 at 1702 which is inside FIG. 17 at 1720. One auger has left-hand flights, the other auger has right hand flights that overlap the left hand flights. One of the augers FIG. 17 at 1602 is longer than the other to protrude through the gearbox and connect to the drive coupling located in the gear box FIG. 17 at 1710. The augers are constructed from solid materials with connection slips for machining purposes. The augers are constructed in segments to reduce the material and labor cost to fabricate the assembly. The segments are also interchangeable for simpler fabrication. The gear drives in the gearbox 1710 are keyed into the shaft and sealed on both sides. The gearbox consists of double lip seals, bearings and spur gears. The length of the gearbox is extended to carry the cantilever load of the screw flights FIG. 17 at 1602 and 1604.

All surfaces are machined on the contacting side of both items FIG. 17 at 1602 and 1604 after welding. The housing FIG. 17 at 1702 is pre-welded before machining the interior to require a straight design. The connecting flanges at both ends and the inlet match the gearbox and the reactor bolt pattern. FIG. 17 at 1704 is machine tapered to reduce the outlet area to increase back pressure inside the heated airlock feeder (FIG. 17). This feeder assembly is welded to a reactor matching flange FIG. 17 at 1706 and then welded to the body of FIG. 17 at 1702. FIG. 17 at 1604 is welded to FIG. 17 at 1602 and then this entire assembly slides through the body of FIG. 17 at 1702 and protrudes flush to the end of FIG. 17 at 1704, the outlet ports. The gearbox and the assembly housing rest on the support frame FIG. 17 at 1732. This assembly is bolted in the back is the main anchor point for the entire reactor. As the heated airlock feeder expands due to the heat it expands lengthwise. To address the expansion, this apparatus is supported with a cart FIG. 17 at 60 to allow the machine to expand, without creating stress on the supports. Existing art used shorter sections that are bolted together and constructed from a very thick material to absorb the heat. This design used a thinner material for better heat transfer but requires a moveable support system.

The solid, shredded plastic material (environmental temperature) is fed into the heated airlock feeder at 1708 on FIG. 17, the heat is applied at 1720 on FIG. 17, and the heated plastic material which is in a molten state is created from the solid shredded plastic material (environmental temperature) at where 1602 connects to 1604 in FIG. 17. 1602 and 1604, a continuous auger is located inside tubular barrel housing 1702 which is located inside 1720. The airlock is created at the end of 1604 in FIG. 17 from the back pressure from the solid, shredded plastic material (environmental temperature) pushing on it.

This apparatus is used to induce heated plastic material into the main reactor and act as an airlock at the same time. By applying back pressure on the fed plastic material, between the solid, shredded plastic material and melting material (molten plastic material), a dead spot depicted on FIG. 17 at 1604 is created. At 1604 there are no flights on the shaft. This dead spot created by this process, depicted on FIG. 17 at 1604, allows molten plastic material to build up pressure by the incoming solid, shredded plastic material (environmental temperature) being fed into the apparatus at 1708 on FIG. 17. This area 1604 also has a larger shaft area, which fills the void between 1604 and 1702. This larger shaft increases the pressure inside creating an airlock effect. The discharge of the airlock feeder is also restricted at 1704 on FIG. 17 by the two openings that are greatly reduced in size compared to the opening where the solid, shredded plastic material (environmental temperature) is fed at 1708 on FIG. 17. When the feeder is shut down, the plastic material remains inside the feeder in area at 1604 on FIG. 17 because even as the feeder augers at 1602 on FIG. 17 continue to rotate, the plastic material will not be pushed out from the housing at 1702 on FIG. 17. The reason for this is because the heated molten plastic material is only pushed out when new solid, shredded plastic material (environmental temperature) is introduced. The incoming plastic material creates pressure and forces the molten plastic material in area 1604 to be displaced. This means that when the airlock feeder cools off, the remaining plastic material will turn to a solid and seal until the next run. When the next run occurs, this plastic material will melt when reheated and allow the augers at 1602 on FIG. 17 to rotate.

This apparatus also heats the plastic material to a vapor and liquid state with a clamshell burner at 1720 on FIG. 17. The heating source for this airlock feeder are two clamshell heaters FIG. 17 at 1720. These two clamshell heater boxes produce the heat needed to make the airlock seal and start the vaporization of the plastic inside the feeder. The plastic material is heated from the discharge end to mid-way of the airlock feeder. By having two heater zones, the material is transformed from a liquid state on one end, to the shredded state on the other. Between this transition exist a molten plastic material. This molten plastic is thick and sticky and forms the needed pressure to create an airlock affect. This clamshell boxes come in contact with the airlock feeder with the seal FIG. 17 at 1724. This allows for greater expansion of the housing FIG. 17 at 1702 from the clamshell fire boxes because of boxes are insulated on the inside, not allowing the metal to expand as on the outside. The Heated Airlock Feeder has two clamshell box burners. One box covers FIG. 17 at 1604 of the internal auger, and the other heats the auger at 1602 of the auger. The advantage of two clamshell heater box burners is demonstrated on startup and shutdown of the reactor. Allowing the auger FIG. 17 at 1602 to cool to a point that a plastic seals is achieved to create the airlock needed for start-up a shut down. The molten plastic cools into a solid around the auger and the housing, sealing off the feeder. The ability to cool rapidly is also a big advantage of using clamshell heaters. The burners' flame can be extinguished and the fans may continue to run to cool the housing FIG. 17 at 1702.

The clamshell burner boxes are used as the heated airlock feeder requires a continuous even supply of heat to produce molten plastic. The correct amount of controlled heat is vital to the process for consistent material flow. Processes of this nature require heat from all directions. The need for a high velocity airflow in a circular box would suffice for this process. Heater boxes with process structures penetrating through the box will also require a seal system to prevent leaks. Expansion of the penetrating structure in both length and diameter was considered in this design. The ability to both heat and cool are required in this process.

The penetrating structure needs support capability to prevent damage to the heater box seals. The penetrating structure (pipe or tube) would need to be supported outside the heater boxes. Due to heat expansion on the penetrating structure a mobile support is required. The requirement for controlling the expansion direction is also needed to prevent warping of the penetrating structure and deflection that would damage the heater box seals requiring a controlled support system to restrict deflection in the direction that might damage the equipment. Furnace heater boxes are used in many processes to produce heat required for incinerating, cooking, melting, and for other heat required processes. When a cylinder or tube penetrates a heater box, problems with uneven heating, seal leakage and expansion may occur. Also the need to access the penetrating tube are pipe is required. A clamshell design was implemented for these reasons. The clamshell design allowed for a circular shape to match the profile of the penetrating pipe or tube. This close profile along with high velocity airflow ensures even heating around the penetrating pipe. The clamshell design has a very low profile interior to reduce the amount of space between the heat source and the penetrating pipe surface, increasing the heat transfer without increasing the BTU value required by a burner system. Compared to a standard burner box where a burner is attached on one side of the box at a distance not allowing an open flame to come into contact with the penetrating pipe, this design uses very small flame points to distribute the heat one third of the way around the penetrating pipe. This reduces the total BTU value.

The disclosed design is modular construction for quick shop assembly and quick installation. This also allows for easy maintenance in the field. The modular design can be completely assembled and tested, for example, in an industry shop. Disclosed embodiments combine both types of heat, convection and radiant, producing an even heat source around the penetrating pipe. A perforated screen may be utilized to distribute the gas fuel and control the flame height while allowing airflow through the heater box. A burner package can be used to supply both the gas and air mixture for igniting. In the discloses system, the igniting source is inside the clamshell burner box next to the perforated screen. A flame sensor is used to ensure ignition and a fan pressure switch is used to ensure airflow. Dual gases can be used by adjusting the gas quantity or the air quantity as discussed below. Existing systems use complicated air control dampers to adjust the air to gas ratio, causing uneven burning of the fuel creating irregular flame size. The air velocity and pressure must be at a fixed rate to insure the mix gas exits the perforated holes as needed as not to allow for the mix gas to ignite under the perforated screen.

The disclosed design overcomes the aforementioned problem by stopping the gas flow and allowing the air to continue when the temperature is over a given set-point. When the system cools to a low set-point, gases are allowed back into the mix and reignited. This control is achieved with a standard PIO controller with thermocouples to indicate internal temperatures. The clamshell design allows for access to the refractory liner that is installed only on the top half of the clamshell. All known heater boxes are normally lined with refractory on all surfaces. The lower half of this clamshell has no refractory liner, allowing any heat buildup to dissipate through the box surface and it ensures that the surface temperature remains below the auto ignite point. The perforated screen acts as a pressure regulator between the mixed gas and the flame above. This chamber is being fed with ambient air and mixed gas, both at ambient temperature. This keeps the lower half of the clamshell cooler. Without refractory on the lower clamshell, refractory replacement is not needed.

The radiant heat from the flame is not in contact with the bottom portion of the penetrating tube FIG. 17 at 1702. The airflow from the burner forces air around the penetrating to carrying heat completely around the penetrating to because of natural disturbance. The movement of this air regulates the radiant heat surface of the penetrating tube by pulling excessive heat into the airstream forcing the air around the penetrating tube through an exhaust port. The perforated screen has small flames running the entire length and one third around the penetrating tube. This prevents hotspots that normally occur in burner boxes. By heating the penetrating tube in all directions expansion occurs in all directions.

Figure 20:
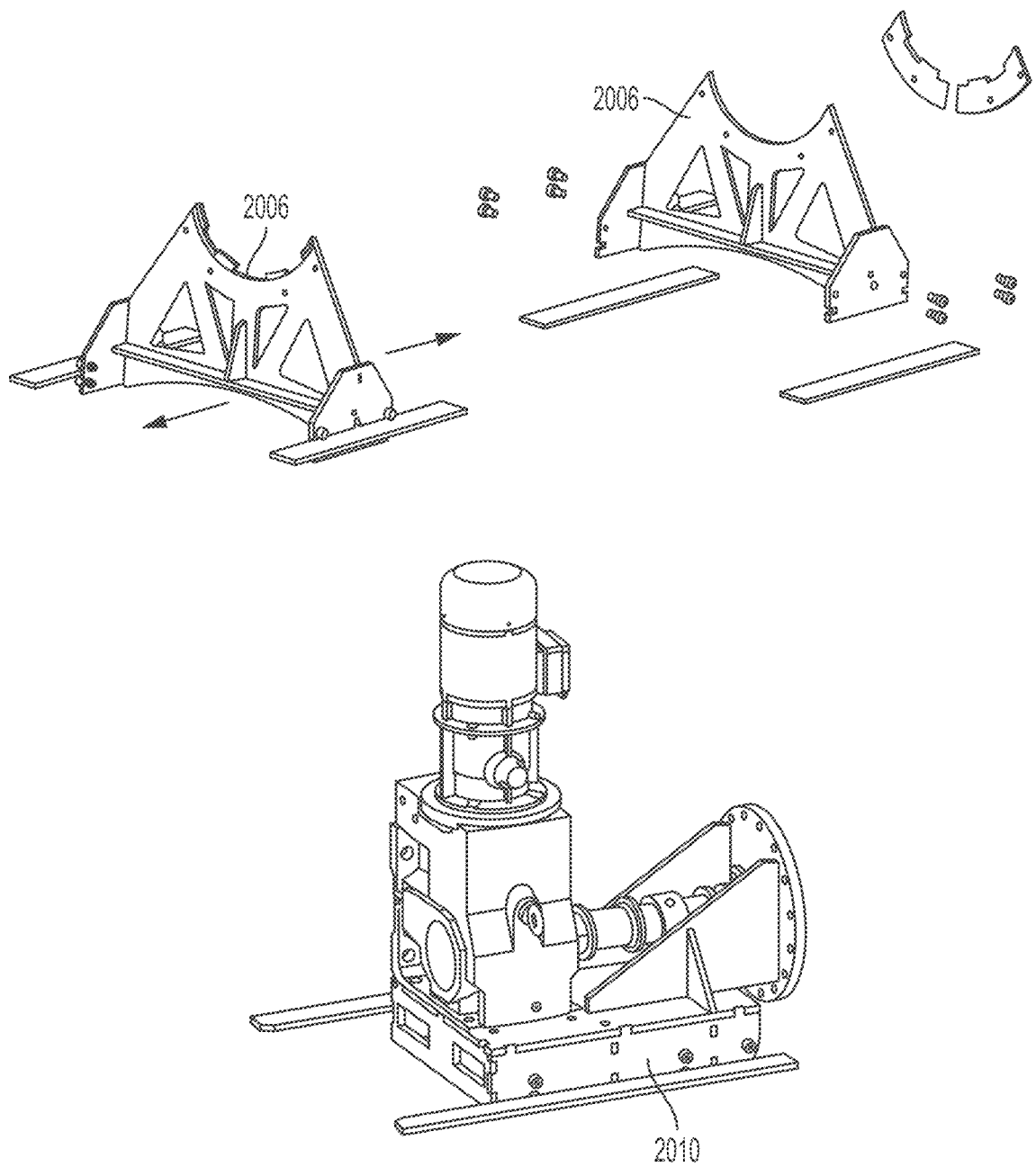
FIG. 20 illustrates a movement assembly or cart assembly for providing thermal expansion according to one embodiment of the present invention.

To prevent deflection or misalignment of the penetrating tube while being heated, the expansion direction is controlled with a support system. The support attaches to the expansion tube and prevents movement from unwanted directions. As shown, for example in FIGS. 17 and 20, the cart 2006 consists of cam followers that are pinched between two structural flat bars, one on each side of the cart. The cart width is designed so that it is within one-eighth of an inch in between the width of the two structural flat bars so that it drops between the structural flat bars and ensures lateral movement. The cam followers (rollers) support the weight of the penetrating tube while preventing it from expanding up or down. This allows for the control of expansion direct action is in a lateral movement only. Typical pipe support rollers allow expansion in multiple directions. This design restricts expansion to lateral movement only keeping the penetrating tube from misaligning.

The assembly is mounted on a steel skid mount frame FIG. 17 at 1732. The clamshell heater boxes consist of an upper FIG. 17 at 1720 and lower FIG. 17 at 1726 section. These sections are connected with a matching bolted flange and a seal chamber, FIG. 17 at 1724 that encompasses the penetrating tube. The gas air inlet box is mounted on the bottom section FIG. 17 at 1726 to allow air gas mix into the lower section. The lower section has a perforated metal screen FIG. 17 at 1734 welded 3 inches above the lower section FIG. 17 at 1726. This acts as an air chamber to distribute mixed air and gas through the perforated screen. The amount and diameter of the holes in the perforated screen are vital to control the flame height while allowing the volume of gas and air mix to pass through. The lower clamshell FIG. 17 at 1726 also has an air mixture box FIG. 17 at 1728 and the burner connection port FIG. 17 at 1740 connected to it. The mixer box FIG. 17 at 1728 has a flared configuration to distribute the air gas mix evenly under the perforated screen FIG. 17 at 1734. The mixer box FIG. 17 at 1728 creates some back pressure to the air gas mixture which ensures a consistent gas air ratio for each opening in the perforated screen FIG. 17 at 1734. A burner can be connected to the port FIG. 17 at 1740. The burner igniter, along with the flame indicator, is located to the top of the perforated screen FIG. 17 at 1734. An access pipe FIG. 17 at 1736 is used to penetrate through both the lower clamshell FIG. 17 at 1726 and the perforated screen FIG. 17 at 1734, for an igniter and for the flame sensor FIG. 17 at 1738 to be mounted. A continuous pilot light FIG. 17 at 1738 is installed through this pipe and stops above the perforated screen FIG. 17 at 1734. The pilot light proof of flame is required to indicate a flame is present until gas is allowed into the air gas mixture.

When the heat set point is reached the gas alone, from the air gas mixture, ceases while the fan continues to run and push fresh air through the burner box. The pilot light continues to run in this phase of the heating process. Control of the heat is used with a PID controller. This controller is fed by thermocouples located on the top clamshell FIG. 17 at 1720. A wide range of temperatures can be achieved and controlled with this type of process. The ability to switch between fuel gases is also possible with this design. Two sets of solenoid valves located on the burner FIG. 17 at 1742 and have adjustable orifices to allow a fixed amount of gas to enter into a consistent amount of air. Natural gas mixed with air requires a different air mix ratio then syn-gas would require with the same air volume. Adjustment of the fixed orifices allow for switching between the gases. The expansion of the penetrating tube FIG. 17 at 1702 is controlled by the cart support FIG. 17 at 1718. This cart consists of heavy metal plate construction, resting between two flat bar retainers FIG. 17 at 1746 that are welded to a frame FIG. 17 at 1732. This allows the cam followers to roll on a smooth surface, preventing up and down movement. The cart width is only 118" less than the space between the flat bars FIG. 17 at 1748, preventing side to side movement and up and down movement while allowing left to right movement only.

By preheating and vaporizing the plastic biomass material under positive pressure and high heat, the main reactor depicted in FIG. 1 is shortened by about 40 feet to acquire the same performance as a standard reactor section would do. This reduces the reactor (FIG. 1) expansion length along with the auger FIG. 17. This reduction in size increases the torque in this area as the auger is shorter. The auger on the upper reactor depicted in FIG. 1 at 1 is where the most torque is required due to the large amount of liquid plastic contained within the reactor. The further the plastic travels down the reactor depicted in FIG. 1, the more plastic material is converted to vapor and the less the auger has to work.

Figure 18:
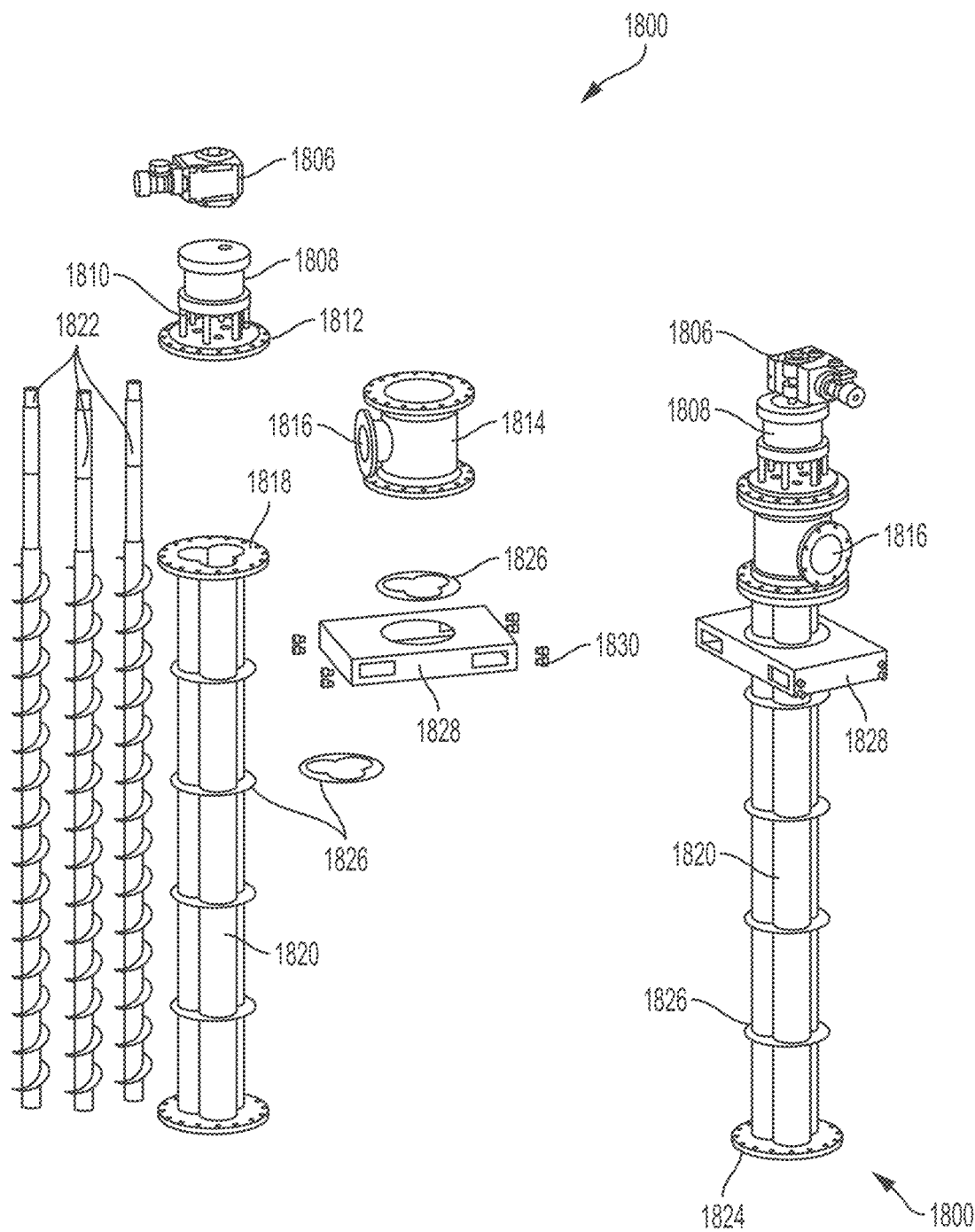
FIG. 18 illustrates an assembled view and an exploded view of a char separator according to one embodiment of the present invention.
Figure 19:
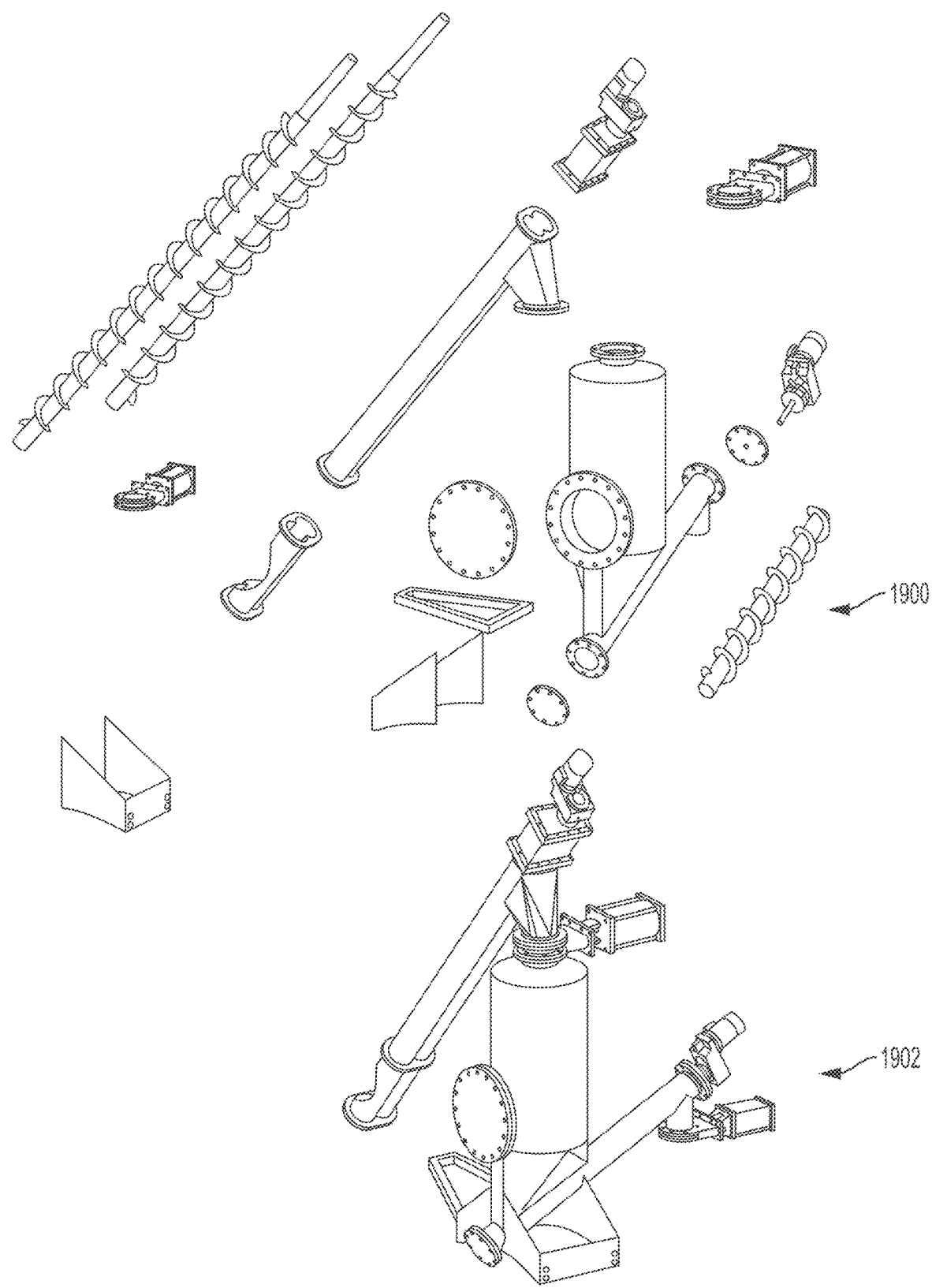
FIG. 19 illustrates a char discharge system according to one embodiment of the present invention.

The burner boxes depicted in FIG. 17 at 1720 are in two section. This allows for controlled heat zones. This control is needed to maintain the airlock effect during startup and shut down of the reactor. As the reactor heats up, it will start to build pressure inside. This pressure will look for a way out of the reactor. First is the heated reactor feeder that is the apparatus that is the subject of this patent application depicted in FIG. 17 and the second and third areas where the pressure may leave the system is at the ash discharge depicted in FIG. 19 and at the and the ash or char separator 1800 depicted in FIG. 18. The char discharge system 1902 in FIG. 19 is a seal with slide gates preventing vapor loss. The char separator 1800 depicted in FIG. 18 allows the vapors to be removed.

Char Separator

The char, or carbon ash, is created when the shredded plastic that enters the reactor makes contact with the reactor's hot surface area. As the shredded plastic makes contact with the reactor's hot surface, it is thinly spread across the surface of the reactor and heat from the reactor vaporizes the shredded plastic by the disclosed design.

A thin layer of the shredded plastic, as well as the contaminants contained within the shredded plastic, is left behind on the reactor's steel tubing and as is cooked to a solid char which then becomes airborne. Small particles of char, e.g., approximately 3 microns or smaller, become airborne and travel with the fuel vapors. This char is collected with the vapors and condensed into a liquid in high concentrations and makes the produced fuel a substantially, and in some cases, an extremely thick liquid, because the char is a solid particulate contained within the liquid. This particular carbon char is required to be removed from the fuel in order to produce a higher quality fuel.

In one exemplary embodiment, the char separator of the disclosed application not only addresses but substantially eliminates the problems of the prior art, as discussed above. The char separator may serve as a vapor refining system for further processing or refining the fuel generated by the disclosed system. Turning to FIG. 18, char separator 1800 consists of a plurality of screw-type conveyor augers 1822 running in a vertical split tube 1820 that are placed so that their respective flights intersect with each other. Vertical split tube 1820 may be regarded as a support tube structure for accommodating and providing a degree of protection to additional structures, as described below. In one disclosed embodiment, three screw conveyor augers 1822 are utilized in within vertical split tube 1820. Augers 1822 may comprise stainless steel of any grade. Augers 1822 provide for a downward rotation, cleaning each other from buildup as their flights intersect. As the hot vapors leave the reactor and enter the vertical split tube 1820, they travel upwardly therein. The vapors lose heat as they rise up vertical split tube 1820. The temperature in the column is controlled so that the favored hydrocarbon chain vapors pass through vertical split tube 1820 and leave vertical split tube 1820 at the discharge 1816 where the vapors are collected. As the vapors rise and the temperature of the vapors is reduced to the value at where a high carbon chain fuel will condense, it will collect on the augers 1822 where augers 1822 will push the condensed fuel back to the reactor. The temperature of the vapor is dependent on a set point of the reactor which may vary in accordance with achieving a prescribed fuel boiling point(s). For example, in an exemplary embodiment, the vapor set point temperature may be established at approximately 700 F-800 F. The flow pattern of the vapors through char separator 1800 generally follows the auger profile of the three augers 1822 as it rises through the unit before it is exhausted.

The condensed hydrocarbon fuel is a sticky substance and may be generally classified as a heavy tar with carbon particles. The vapors flowing in vertical split tube 1820 will travel across the sticky hydrocarbon fuel condensed on augers 1822 where the sticky substance will catch the carbon ash that is traveling with the vapors as the carbon ash is constantly looking for a substance to which to make contact. The collected mass on augers 1822 is then forced down into a lower reactor (e.g., separate system, not shown) where it returns to the reactor's heat returns to a heat zones through the discharge flange 1824. The collected mass is then reheated in the lower reactor (e.g., separate system, not shown) of the re-useable fuel apparatus in which it vaporizes, breaking high carbon chains into lower carbon chains. The lower carbon chain material will then travel back through vertical split tube 1820 and any carbon ash that travels with it will stick again to augers 1822 and be returned and any lower carbon vapors will pass through vertical split tube 1820 and be discharged from exhaust port 1816 as clean vapor, for example, ultimately to a fuel cooling system. Thus, the clean vapor can be routed through a distillation column and/or a condensing unit in order to condense or cool down the condensable part of the vapor stream back to a liquid. The condensed liquid forms a diesel fuel carbon chain hydrocarbon which is an end product of the entire process.

The amount of heat rise in vertical split tube 1820 can be controlled by both the RPM of the augers and the outside insulation of the column. For example, the column can be insulated by lagging on the outside to hinder heat dissipation to the surrounding. A drive system is provided to enable augers 1822 within vertical split tube 1820. The drive system may include an auger gearbox drive 1806 that utilizes gearing to drive and control augers 1822. In one embodiment, auger gearbox drive 1806 utilizes spur gears to control the rotation and timing of the augers 1822. By controlling the heat in vertical split tube 1820 the carbon-chain hydrocarbon fuel selected by the heat value chosen will be allowed to pass through. Vapors comprised of condensable and non-condensable hydrocarbons can be cleaned of carbon char by the char separator 1800, since the augers 1822 can be configured to rotate against the vapor flow. By adjustment of ample speed, various parameters can be achieved towards a desired point or outcome.

Construction of vertical split tube 1820 may consists of a plurality of split tubes. In one disclosed embodiment, three split tubes 1820 may be utilized to encircle the augers, for example, as a prescribed geometrical shape such as a clover design in a final assembly depicted in FIG. 18. A clover design shape is utilized by select embodiments, because the augers 1822 need to mesh into each other so that self-cleaning can be achieved. While a clover design is illustrated in FIG. 18, it is readily appreciated that any design shape suitable for providing an enclosed supported structure may be utilized in the disclosed embodiment as necessary.

Accordingly one skilled in the art may utilize more than three augers 1822 with accompanying different shapes to form an overall outer tube around the same. The shape is welded together and supported with a plurality of outer support bands or rings 1826 to keep and maintain the overall shape of three split tubes 1820 thereby keeping the assembled split tube structure intact throughout exposure to and/or due to heat warping.

Gearbox drives 1806 may be accommodated within/throughout gearbox housing 1808, to drive screw augers 1822 via connected drive shafts of the screw augers 1822. In one disclosed embodiment, gearbox housing 1808 is designed with a packing seal space or air gap 1810 disposed within gearbox housing 1808, as further described below. Gearbox housing 1808 may also comprise a support flange and seal 18212 for connecting to an exhaust housing 1814, detailed below.

A connecting flange 1818 may be provided at one end of vertical split tube 1820. An exhaust system provided as exhaust housing 1814 having a corresponding attachment flange 74a at one end may be provided to attach to connecting flange 1818 to provide a final connection. In the illustrated exemplary embodiment, exhaust port 1816 is disposed in a side of exhaust housing 1814. Another corresponding attachment flange 71a may be provided at another end of exhaust housing 1814 for providing a final corresponding connection with support flange and seal 1812 of gearbox housing 1808. Vertical split tube 1820 may provide a discharge flange 1824 at another end configured for connection with, for example, another reactor (e.g., separate system, not shown). A plurality of support rings 1826 may be disposed at intermediate points along a length of vertical split tube 1820 to provide support thereto and facilitate maintaining an outer peripheral shape of vertical split tube 1820. The inner periphery of each support ring 1826 may correspond to an outer peripheral shape of vertical split tube 1820.

A thermal expansion system is provided as an expansion cart or rolling cart 1828. Expansion cart 1828 may be provided with cam followers 1830. In on disclosed embodiment expansion cart 1828 is disposed around a section of vertical split tube 1820. In some select embodiments, vertical split tube 1820 may be secured to expansion art 1828 (such as via a welded connection). As further described below, expansion cart 1828 is employed and designed to support char separator 1800 in connection with the support structure of re-usable energy reactor system 100. In addition, while supporting char separator 1800, expansion cart 1828 allows movement of char separator 1800 in accordance with any thermal expansion or contraction of the support structure of re-usable energy reactor system 100 due to temperature fluctuations.

The discharge gases are expected to be over 500 degrees Fahrenheit and may overheat the gear box 1808. To prevent the gearbox oil from overheating a ventilation system is provided as an air gap 1810 and therefore serves as a design feature in the unit to allow venting. Vertical split tube 1820 is attached to the lower reactor and is configured to travel or move in accordance with and to accommodate any thermal expansion of the reactor. To do so, an expansion cart or rolling cart 1828 is disposed generally at a top of vertical split tube 1820. Expansion cart or rolling cart 1828 is further configured in supported relation along an exterior structure such as the framing of a re-usable energy reactor system 100 (FIG. 1). In one exemplary disclosed embodiment, rolling cart 1828 is configured with wheels received by corresponding tracks disposed, for example, along an accommodating structure of re-usable energy reactor system 100. The tracks may comprise a rigid design sufficient to accommodate the weight of char separator 1800. Since the char handler is bolted directly to the bottom reactor (which expands, contracts or elongates due to temperature fluctuations) as the reactor expands, rolling cart 1828 can roll on its associated wheels in accordance with any thermal expansion to cater to expansion in a prescribed direction.

Where the column attaches to re-usable energy reactor system 100, that section of the reactor is smaller in diameter and uses a ribbon type flight to allow for faster removal of solids while allowing vapors to pass back through the ribbon flights. This section has a reverse rotation to the main auger located within the reactor where the main auger is pushing any dry char or heavy fuel deposits towards the char discharge. This section of the main reactor has two controlled heated zones that will re-heat and help in thermal cracking the high carbon chains that are pushed back into the main reactor by char separator 1800.

Process Flow

The principle characteristics of the disclosed embodiment provides continuous feed process, feedstock flexibility, and does not require a catalyst in its pyrolysis process of turning plastic waste into liquid fuel. The disclosed system overcomes some of the problems associated with prior art designs due to its continuous use and higher efficiency of heat exchange.

Figure 2:
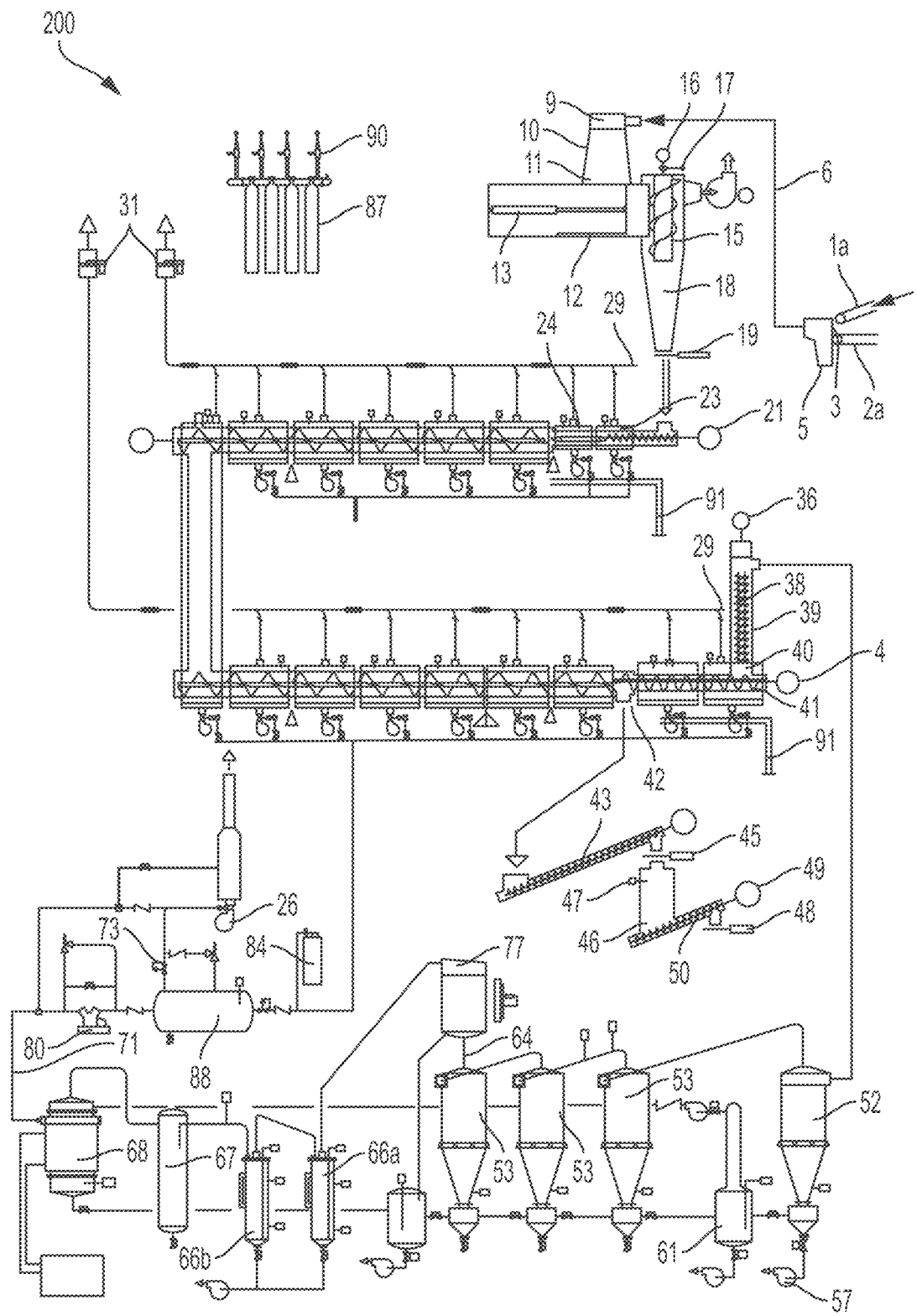
FIG. 2 is a schematic illustration of a process flow according to one embodiment of the present invention.

In the case of plastic bags, a pinch conveyor depicted on FIG. 2 at 1a and at 2a compress the bags into an opening as depicted on FIG. 2 at 3 and introduce them into a de-stoner hood. The bags are then conveyed through a duct work depicted on FIG. 2 at 6 into the receiving hopper depicted on FIG. 2 at 9. The de-stoner unit can be used on plastic bags, ground plastic, and shredded plastic. The incoming conveying air through the duct depicted on FIG. 2 at 6 will lift the plastic but will allow heavier objects like rocks and metal to fall out of the opening depicted on FIG. 2 at 5. Once the plastic material is moved into the receiver depicted on FIG. 2 at 9 it drops into the ram section depicted on FIG. 2 at 11 while the ram is pulled back by the air cylinder depicted on FIG. 2 at 13 allowing the plastic to drop into the chamber. A photo-eye depicted on FIG. 2 at 10 indicates the height of plastic. By blinding the opening depicted on FIG. 2 at 11 with the ram, it can stop the air from conveying material and can stop the ram depicted on FIG. 2 at 12 pushing the material into the bag press depicted on FIG. 2 at 15.

The bag press depicted on FIG. 3 is a set of twin augers with a large center diameter. The large center diameter is used so that the bags do not wrap around the center drum and plug the auger. The bags are pushed down the housing and compressed in the location show on FIG. 2 at 18. As the bags are being forced downward, pressure causes the motor depicted on FIG. 2 at 16 amps to climb and to trip a current transducer depicted on FIG. 2 at 17 stopping the drive. When this drive stops, the ram movement stops and the conveying of material stops when high level is made and picked upon the photo-eye depicted on FIG. 2 at 10.

The drive on the bag press depicted on FIG. 2 at 16 is on a timer that continues to push bags downward to the discharge area depicted on FIG. 2 at 18. When the drive depicted on FIG. 2 at 16 timer runs out, the motor drive depicted on FIG. 2 at 16 will try to rotate the auger depicted on FIG. 2 at 15. If the auger depicted on FIG. 2 at 15 continues to turn, indicating low material (low back pressure) inside the hopper area depicted on FIG. 2 at 18, then the feeding process reactivates.

The gate depicted on FIG. 2 at 19 opens to allow plastic material to flow into the heated airlock below and is used for start-up and shut down purposes. As the material flows into the heated airlock, volume is relieved in the bag press depicted on FIG. 2 at 10 allowing for more product to be introduced into the bag press depicted on FIG. 3 via the ram. The material flowing out of the bag press is pushed into the heated airlock. This material is then pushed by a twin set of augers to the heating chambers depicted on FIG. 2 at 23 and 24. As the chambers heat the plastic, the plastic melts filling the auger housing, creating an airlock by sealing the auger to the side walls with plastic.

A continuous flow of input plastic maintains the airlock seal. As the area between the melted plastic and the solid plastic is under pressure, this seals the reactor and stops the introduction of air into the reactor and prevents gasses from exiting through the inlet. The heat in the zone depicted on FIG. 2 at 24 starts to vaporize the material. The vaporize material, along with any liquid plastic, enters the next section of the reactor. The plastic is then conveyed down the reactor tube with a double flight cut and fold screw auger. The reactor is wrapped in heater boxes that create heat to vaporize the material inside the reactor tube as the material is being conveyed. The plastic material along with any vapors dropped from the upper reactor to the lower reactor continue to be conveyed to the end of the lower reactor. An opening in the lower reactor depicted on FIG. 2 at 42 is the location where any Char will fall onto a conveyor that will remove it from the reactor to a double gated hopper airlock system. The vapors continue through the reactor through a Ash Separator Tower depicted on FIG. 13.

The char removing system depicted on FIG. 2 at 39 allows the molten plastic to slightly cool, causing heavy carbon chain fuel to stick to the triple screw augers depicted on FIG. 2 at 38 inside the column depicted on FIG. 2 at 39. The screw conveyors inside the column depicted on FIG. 2 at 38 rotate in a downward direction. The screw flights are interlocked within one another allowing for self-cleaning and to push any materials collected on the flights back into the reactor below depicted on FIG. 2 at 40.

The material is pushed into the reactor depicted on FIG. 2 at 40 by a reverse screw conveyor depicted on FIG. 2 at 41 that is situated below the reactor. The screw conveyor depicted on FIG. 2 at 41 is a ribbon type screw that allows vapor to pass through the flights and up through the char remover depicted on FIG. 2 at 39. This ribbon type screw also allows solid particles to drop to the bottom and be conveyed back to the Char discharge area depicted on FIG. 2 at 42. Any heavy fuels pushed down from the Char Separator that enter this chamber will be reheated, re-vaporized, and re-cracked to make lighter fuel that is passed back through the Char separation column depicted on FIG. 2 at 38. Once the vapors pass through Char separating chamber depicted on FIG. 2 at 38 the vapors enter the cooling system depicted on FIG. 6.

The first stage of this cooling system depicted on FIG. 2 at 52 is a standard cyclone that allows for some cooling to take place and collect heavier fuels. This heavy fuel can be returned to the reactor for re-cracking. After passing through the first cyclone, the vapors continue on and pass through the cyclone depicted on FIG. 2 at 52 and then enter the cyclone depicted on FIG. 2 at 53 as the vapor continues to cool. This cooling causes vapors to condense and be collected in the bottom hopper of the cyclone to be delivered to the holding tank depicted on FIG. 2 at 61. This holding tank allows the light fuels, such as benzene, to be removed. A pump depicted on FIG. 2 at 57 pumps the benzene to a coiling condenser depicted on FIG. 8 and FIG. 2 at 68. The vapors that remain will continue on the path through three more cyclones depicted on FIG. 2 at 53 for continuous cooling separation of the fuel. The last three cyclones contain internal force rotation fins depicted on FIG. 7.

After passing through the aforementioned three cyclones, the vapors leave the last cyclone through a duct depicted on FIG. 2 at 64 that feeds into an air forced heat exchanger depicted on FIG. 2 at 77 and FIG. 6. The gas is then pushed from that point into a bubbler system depicted on FIG. 2 at 66 where particles are separated from the gas and the gas is scrubbed of unwanted chemicals. The first bubbler depicted on FIG. 2 at 66*a* contains water which will separate sulfur present in the syn-gas. The gas will bubble through the water which also acts as a flame arrestor. The syn-gas then passes into the second bubbler depicted on FIG. 2 at 66*b* which contains caustic soda. The caustic soda will capture any chlorine gas that may be present in the syn-gas and convert the chlorine gas into salt that will settle to the bottom of the tank for removal. The gases that remain will be syn-gas that passes into an expansion buffer tank depicted on FIG. 2 at 67 then through a coil condenser chiller depicted on FIG. 2 at 68.

The coil condenser chiller is a coil type that uses glycol for heat exchange which reduces the remaining gas temperature to a temperature of 10° F. At this temperature no atmospheric condensable gases remain. The gases flow from the chiller depicted in FIG. 2 at 68 then they are piped as depicted in FIG. 2 at 71 to the syn-gas booster system depicted on FIG. 2 at 80. This gas can be used to generate electricity to power the system. This gas will also be used as fuel for the clam shell burners depicted in FIG. 7.

The syn-gas is boosted using the pump compressor depicted on FIG. 2 at 80 and forced into a holding tank depicted on FIG. 2 at 88. This holding tank builds pressure and is relieved with the pressure regulators depicted on FIG. 2 at 73 and allowed to return to the burners acting as the fuel heat source for the reactors. Excessive pressure may be relieved at 74 depicted on FIG. 2 and allowed to travel to a safety burner depicted on FIG. 2 at 26 where the gases may be incinerated or directed to a gas powered generator to produce electricity.

Pressure safety regulators and bypasses are installed on the system in the event of a power failure. This will allow syn-gas to be re-directed for a short period of time while the reactor cools. The reactor ceases producing syn-gas within a couple of minutes due to heat loss and the fact that the internal gas pressure lowers as the reactor is cooling. The syn-gas stored in the booster tank depicted on FIG. 2 at 88 will allow the system to start on the next run from a cold start. The storage capacity allows for the system to power itself after the initial start-up. At the time of the initial (first time) start-up the system uses an auxiliary gas supply of propane as no syn-gas has been produced by the reactor. The propane tank is depicted on FIG. 2 at 84. This propane tank is a standard commercial propane tank and is used only for initial (first time) start-up. Once the system has been online and is operating properly the supplied syn-gas will be replenished for the next run.

Figure 13:
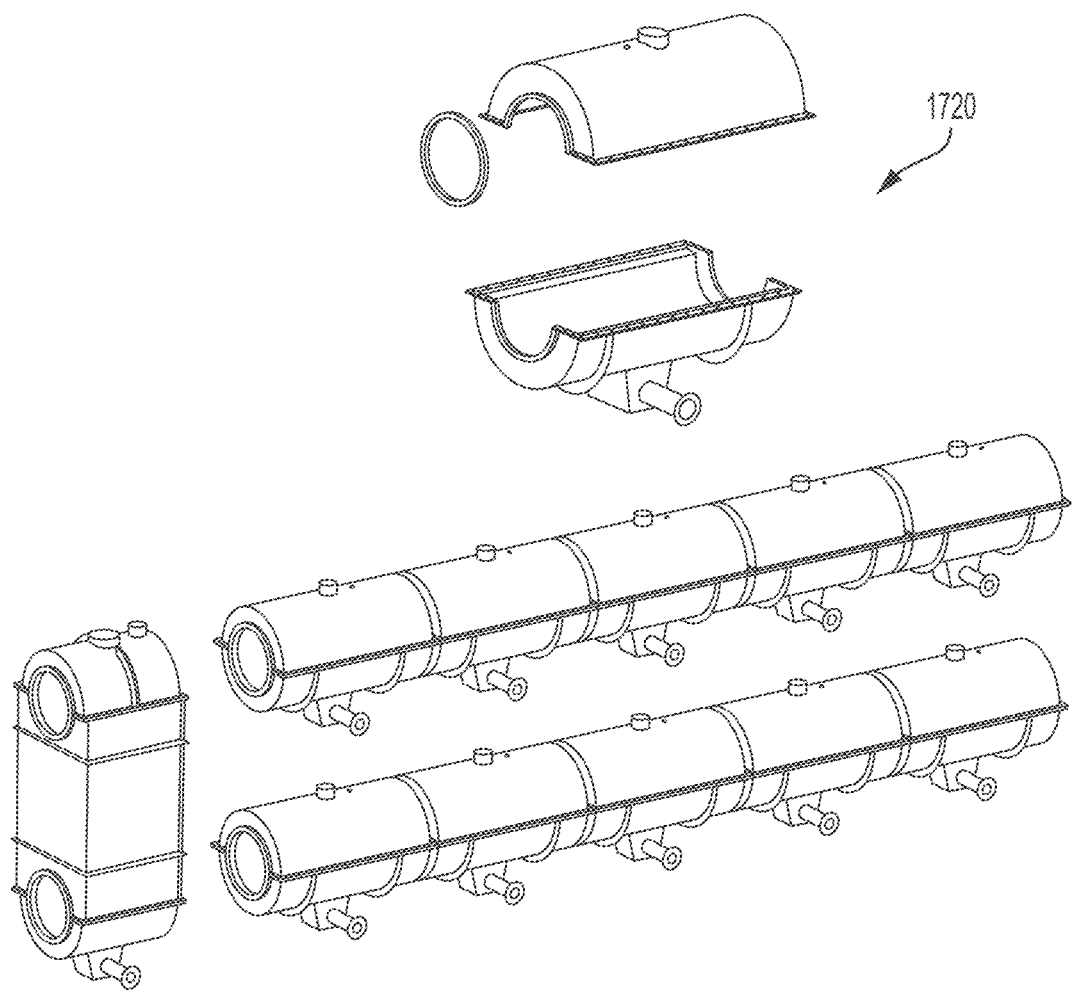
FIG. 13 illustrates an assembly of burner units having an exemplary clam-type shell according to one embodiment of the present invention.

The clam shell burners depicted in FIGS. 13 and 17 are vented to the atmosphere by a series of ductwork and slip joints. The duct work is supplied with a fan depicted on FIG. 2 at 31 that pulls fresh air from the point depicted on FIG. 2 at 29 through the ductwork. Each firebox discharges independently into this main ductwork.

The entire system capacity is controlled by a computer. All of the essential motors depicted in FIG. 2 at 16, 21, 34, and 36 have a variable frequency drive (VFD) drive to allow for variable RPM. A fixed algorithm will control all velocities and temperatures based upon the algorithm's solution based upon the inputs into the algorithm. The char leaving the system at the point depicted on FIG. 2 at 42 leaves through a twin inclined screw conveyor designed in this manner to promote self-cleaning and heat loss. The gate depicted in FIG. 2 at 45 remains open as the hopper depicted in FIG. 2 at 46 is filled to the level indicator depicted in FIG. 2 at 47. The incline char screw depicted in FIG. 2 at 43 will stop and the gate depicted in FIG. 2 at 45 will close while the gate depicted in FIG. 2 at 48 opens allowing the screw conveyor depicted in FIG. 2 at 50 to start. This process is repeated to remove the char.

Figure 21:
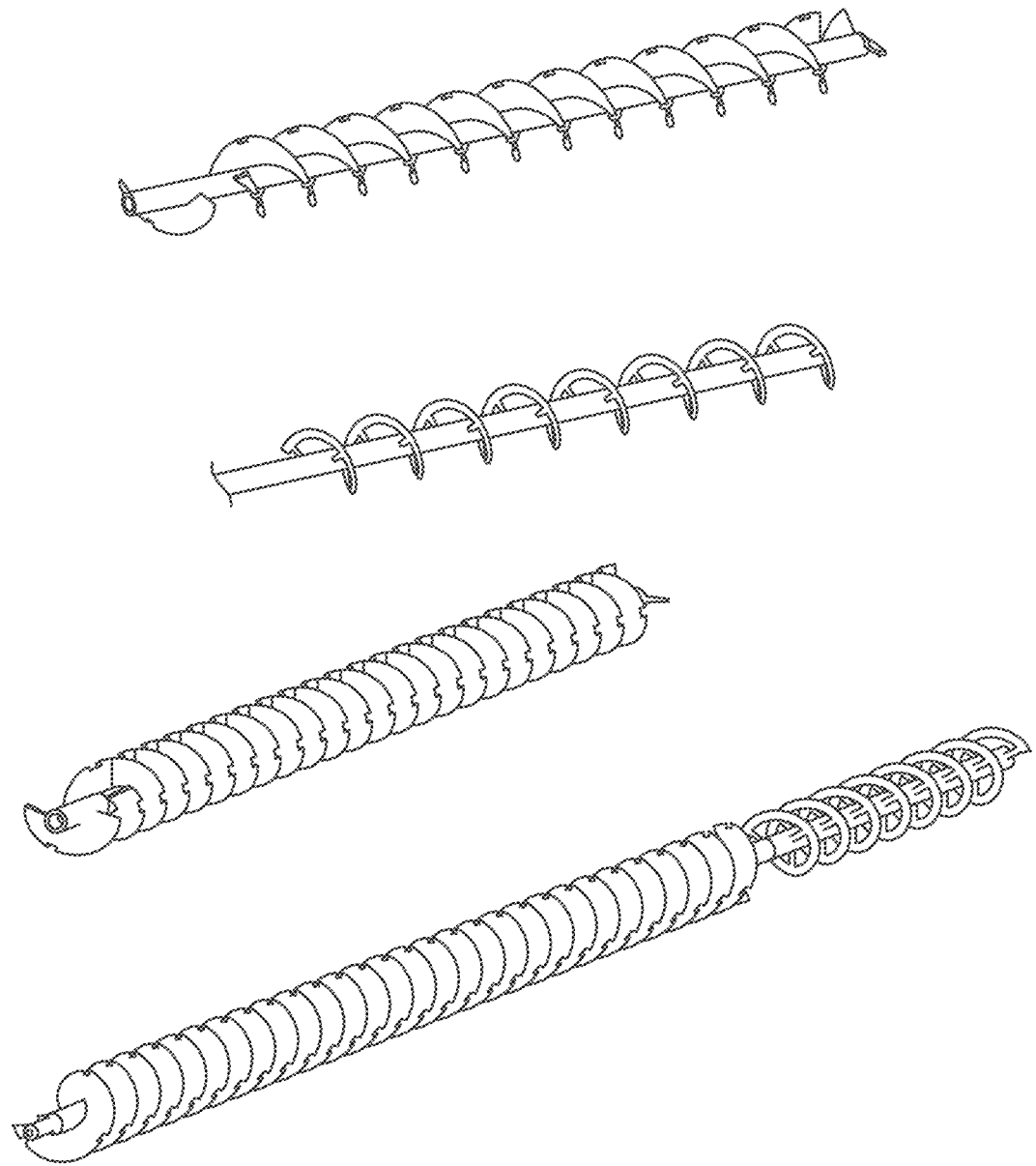
FIG. 21 illustrates screw conveyer types of the disclosed system according to one embodiment of the present invention.

The disclosed process relies on the reactor to expand. The following describes the expansion of the reactor: The plastic mass and vapors enter the reactor depicted in FIG. 9 and is pulled along the upper and lower reactor by double flighted screws that are designed with cut and fold slots depicted in FIG. 21 at 1. The science of the operation is Pyrolysis, which is the act of heating without the presence of oxygen. Therefore, there can be no direct contact of the plastic feedstock to the flame source. The heat from the clam shell heaters (depicted in FIG. 13) surround the reactor tube 1402 (depicted in FIG. 14) creates a high temperature zone that starts the reaction inside of the reactor tube 1402. The reactor tubes 1402 depicted in FIG. 14 will expand due to heat. As they expand they are only allowed to travel in one direction as they are anchored due to the heated airlock feeder depicted in FIG. 17 and are supported by the carts 2006 depicted in FIG. 20. The movement of the reactor is in a lateral direction due to the fact that it is anchored on one side. The tube steel frame depicted in FIG. 2 at 91 has flat bar landings for the carts depicted in FIG. 12 at 2 that are used to travel upon. The upper reactor 1404 is tied to the lower reactor 1406, being fixed by the connecting collar 1408 between the upper and lower reactor. This causes the pulling of the lower reactor 1406 along as the reactor expands. The lower reactor 1406 expands in the opposite direction as it is being heated. The drives depicted in FIG. 2 at 34 and 21 are located at the ends of the reactor tubes and are also attached on roller carts to allow allowing for expansion depicted in FIG. 20 at 2010. The char conveyor system depicted in FIG. 19 is attached to rollers allowing it to be pulled along with the reactor as the reactor expands.

Figure 14:
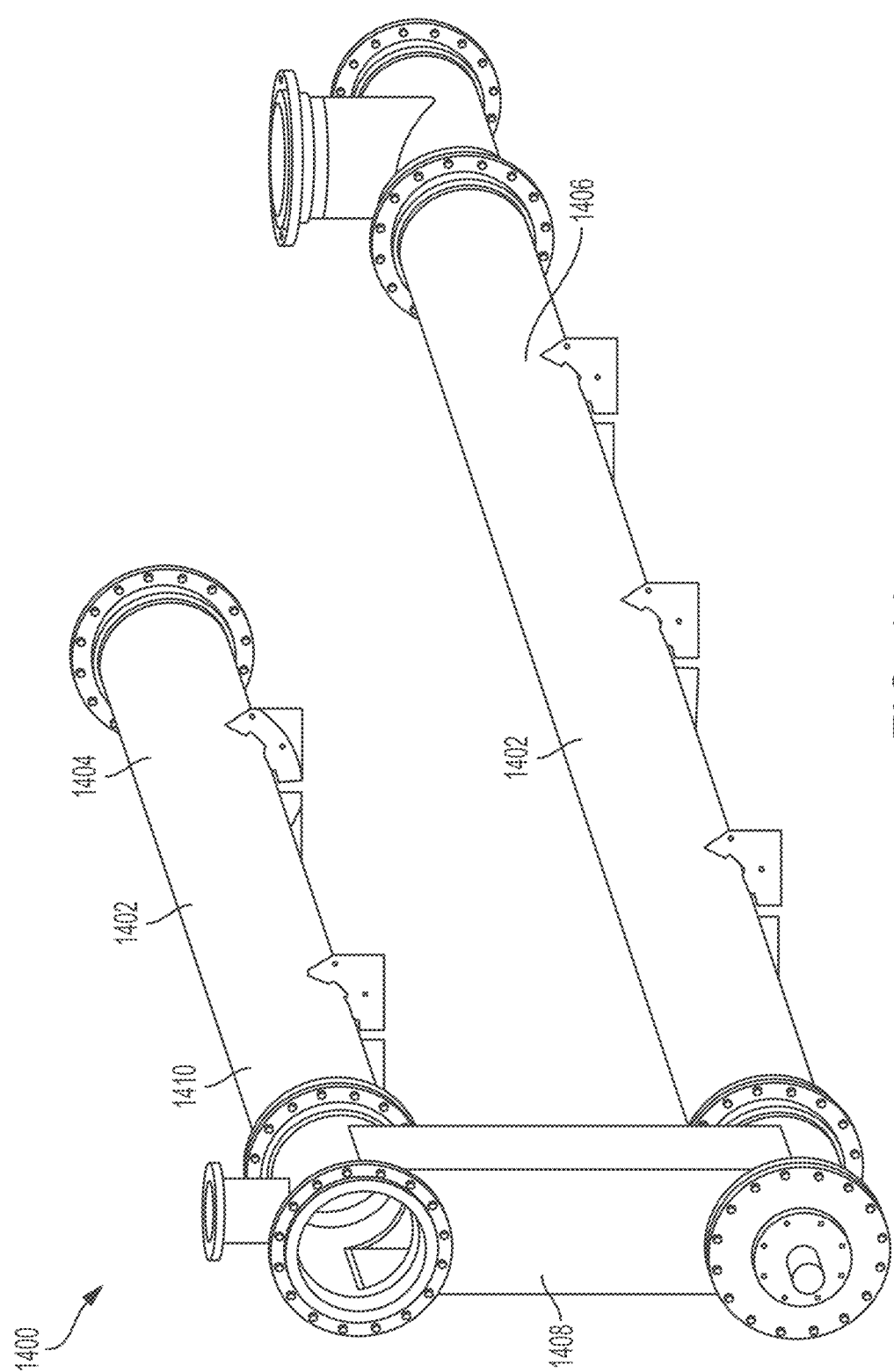
FIG. 14 illustrates an exemplary reactor assembly according to one embodiment of the present invention.
Figure 15:
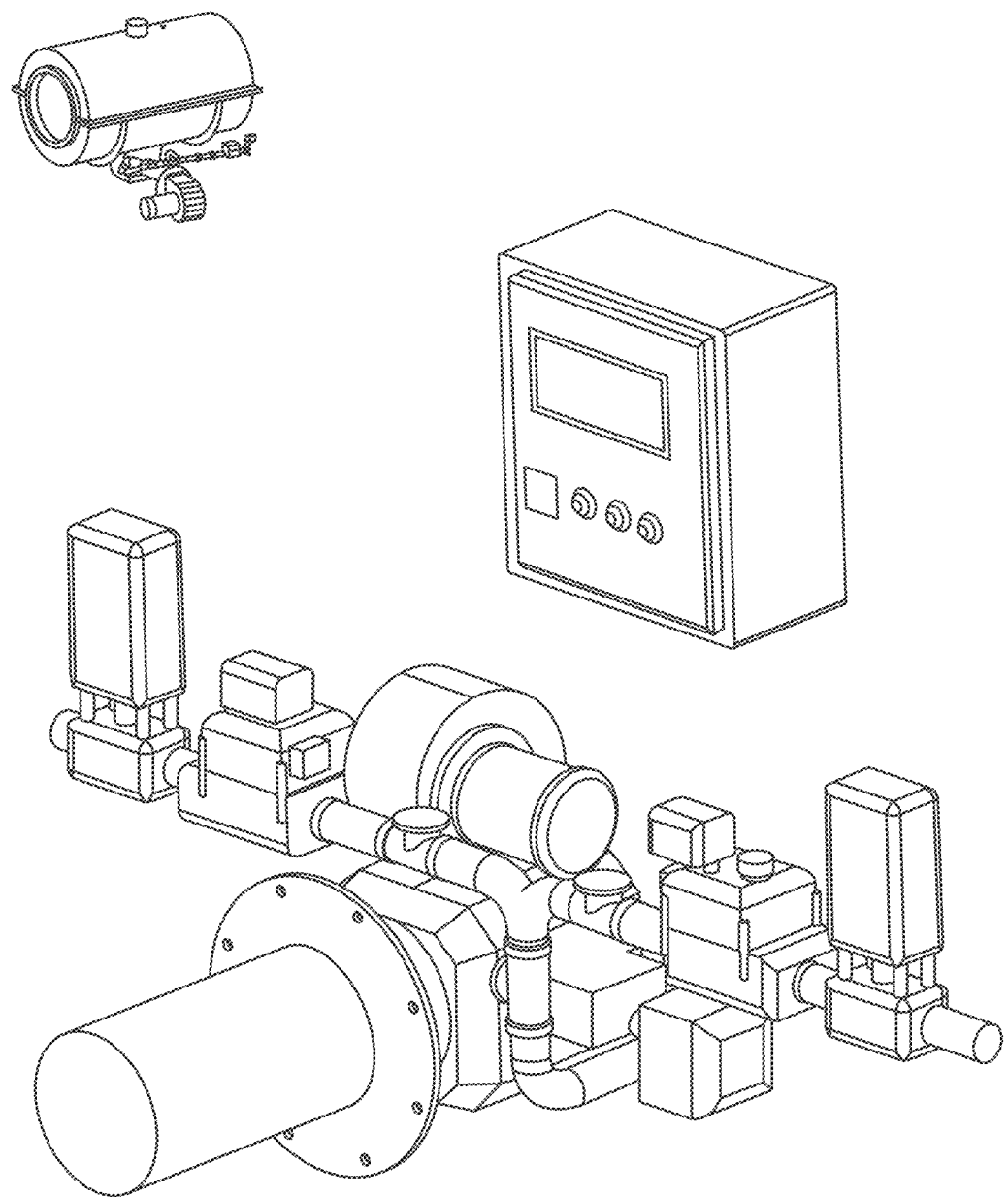
FIG. 15 illustrates an exemplary burner designed as a dual gas burner unit according to one embodiment of the present invention.

The advantage of the disclosed two stack reactor design described above is that stacking of the reactors allows for a system that is half the length dividing the expansion between the upper and lower reactor tubes depicted in FIG. 14. The second advantage of the design of this system is that the load on the screw augers inside the reactor is reduced by reducing the length and in turn, reducing the horse power stress.

The process of turning the waste plastic into fuel involves heating the waste plastic inside the reactor. As the plastic is heated inside the reactor 1400 depicted in FIG. 14 it turns to a vapor. This vapor is forced to travel down the tubes from the upper reactor to the lower reactor, traveling the entire length. The vapor is also disturbed by the screw conveyor depicted in FIG. 21 inside the reactor causing a longer path to be created by the screw conveyor flights. This allows for heat to be applied to the vapor and plastic for a longer period of time. This extended dwell time is what causes the vapors to transform into the required c-chains required for the production of fuel. Thermal cracking is used to transform the vapor product into the fuel product required. The temperature and dwell time can be adjusted by adjusting the temperature applied to the burners as well by adjusting the velocity of the screw conveyors depicted in FIG. 21.

The reactor 1400 depicted in FIG. 14 is heated by the clam shell heaters 1720 depicted in FIG. 13 causing the sidewall 1410 of the reactors to heat up. This heat is transferred into the plastic product as it comes into contact with the sidewalls. The screw conveyors depicted in FIG. 21 continue to wipe the product from the wall and move it downstream through the reactor. As any remaining products from the plastic are carried along, they turn into char. Char does not contain any moisture vapor fuels. The char travels down the screw conveyor and enters the char discharge system 1900 depicted in FIG. 19. To insure that vapors are not carried with the Char, the last two heating zones 1750, 1752 are increased in temperature causing any remaining vapors to continue down the reactor and away from the char discharge system 1900.

The system of the disclosed embodiment is protected with a nitrogen purge system depicted on FIG. 2 at 87. In the event of an emergency, nitrogen gas will be piped into the reactor as nitrogen is an inert gas that will displace oxygen and prevent any incoming oxygen from entering into the hot reactor, pressurizing the void inside the reactor. The nitrogen may also be used as a fire suppression system. The control valves depicted on FIG. 2 at 90 may be configured to open under power failure if needed. The nitrogen ports to the reactor are placed in locations where the heat and vapor are the most concentrated.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for processing a material into a fuel comprising:
  a material supply assembly;
  a heated airlock feeder configured to receive and process material from the material supply assembly, the heated airlock feeder comprising two elongated augers connected to a drive coupling, the two elongated augers having axially rotatable screws, the augers terminating at a tapered outlet configured to reduce the outlet area and increase back pressure inside the heated airlock feeder;
  a reactor configured to receive and further process material from the heated airlock feeder; and
  a vapor processing system configured to process vapor supplied by the reactor;
  wherein the vapor processing system comprises a char disposal system configured to separate char from the vapor supplied by the reactor.

2. The apparatus of claim 1, wherein the char disposal system comprises a support body and a plurality of augers positioned within the support body; and wherein the plurality of augers are configured to rotate against a vapor flow to clean carbon char from vapors comprising condensable and non-condensable hydrocarbons.

3. The apparatus of claim 1, comprising individual heating zones dispersed throughout a length of the reactor.

4. The apparatus of claim 3, wherein the heating zones are separately regulated.

5. The apparatus of claim 3, wherein the heating zones are separately powered.

6. The apparatus of claim 2, comprising:

a thermal expansion system connected to the support body.

7. The apparatus of claim 1, wherein a first elongated auger of the two elongated augers has left-hand flights and a second elongated auger of the two elongated augers has right-hand flights.

8. The apparatus of claim 1, wherein the heated airlock feeder further comprises an elongated tubular housing.

9. The apparatus of claim 8, wherein the heated airlock feeder further comprises at least one clamshell burner positioned about the elongated tubular housing.

10. The apparatus of claim 9, wherein the at least one clamshell burner comprises first and second clamshell burners, configured to heat first and second sections of the elongated tubular housing to different temperatures.

11. The apparatus of claim 1, wherein the heated airlock feeder is configured to process the material to a liquid or molten state, and the reactor is configured to process the liquid or molten material received from the heated airlock feeder into a gaseous state.

* * * * *